United States Patent
Luttrell

(10) Patent No.: US 10,885,523 B1
(45) Date of Patent: Jan. 5, 2021

(54) METHODS, SYSTEMS, AND MEDIA FOR PROTECTING TRANSACTIONS WITH SECURE PAYMENT AUTHORIZATION CHANNELS

(71) Applicant: Amino Payments, Inc., Philadelphia, PA (US)

(72) Inventor: David William Luttrell, Philadelphia, PA (US)

(73) Assignee: Amino Payments, Inc., Philadelphia, PA (US)

( * ) Notice: Subject to any disclaimer, the term of this patent is extended or adjusted under 35 U.S.C. 154(b) by 236 days.

(21) Appl. No.: 15/947,664

(22) Filed: Apr. 6, 2018

Related U.S. Application Data

(60) Provisional application No. 62/482,581, filed on Apr. 6, 2017.

(51) Int. Cl.
| | |
|---|---|
| *G06Q 20/40* | (2012.01) |
| *G06Q 20/38* | (2012.01) |
| *G06Q 30/08* | (2012.01) |
| *G06Q 20/36* | (2012.01) |
| *G06F 16/958* | (2019.01) |

(52) U.S. Cl.
CPC ....... *G06Q 20/401* (2013.01); *G06Q 20/3674* (2013.01); *G06Q 20/3829* (2013.01); *G06Q 30/08* (2013.01); *G06F 16/958* (2019.01)

(58) Field of Classification Search
CPC ............ G06Q 20/401; G06Q 20/3674; G06Q 20/3829; G06Q 30/08; G06Q 20/3224; G06Q 20/322; G06Q 20/204; G06Q 20/20; G06Q 20/40; G06Q 20/202; G06Q 20/327; G06Q 30/0601; G06Q 30/0633; G06Q 20/145; G06Q 20/18; G06Q 20/325; G06Q 30/0201; G06Q 30/0207; G06F 16/958
See application file for complete search history.

(56) References Cited

U.S. PATENT DOCUMENTS

| | | | | |
|---|---|---|---|---|
| 10,497,030 B1* | 12/2019 | Agoren | ............... | G06Q 30/0275 |
| 2007/0124229 A1* | 5/2007 | Ku | ........... | G06Q 40/04 705/37 |
| 2008/0133419 A1* | 6/2008 | Wormington | .......... | G06Q 20/12 705/64 |
| 2010/0145809 A1* | 6/2010 | Knapp | .................. | G06Q 30/02 705/14.71 |
| 2014/0164137 A1* | 6/2014 | Mathur | ............. | G06Q 30/0275 705/14.66 |
| 2014/0222661 A1* | 8/2014 | McCarthy | .......... | G06Q 20/1235 705/39 |
| 2014/0279135 A1* | 9/2014 | Semret | .................. | G06Q 30/08 705/26.3 |
| 2016/0292672 A1* | 10/2016 | Fay | ........................ | G06Q 20/36 |

OTHER PUBLICATIONS

Arpit Gupta, Method and system for Exchanging Content, IP.com, Aug. 31, 2011 (Year: 2011).*
Disclosed Anonymously, Advertisement Bidding System and Method, IP.com, Jul. 24, 2006 (Year: 2006).*

* cited by examiner

*Primary Examiner* — Neha Patel
*Assistant Examiner* — Chunling Ding
(74) *Attorney, Agent, or Firm* — Byrne Poh LLP

(57) ABSTRACT

Methods, systems, and media for protecting transactions with secure payment authorization channels are provided. In some embodiments, methods, systems, and media can provide secure payment authorization channels for protecting transactions in connection with the transmission of a digital asset.

18 Claims, 10 Drawing Sheets

```
http://payment.curren-c.net?
r=trackingpixel.ourpartner.com%3Ft%3D234234%26cid%3D234%26pid%3D234234
&t1b=c9273f68b5d3020113fd27c0efaac165f2c9d0767959c31a0ea7b3bfac08b33e
&t1s=eed28849d8cea76329 32ca6e83568af8f27c7adfcc61f5cb9513da81152a9ca4
&t1p=0.40
&t1t=cpm
&h=www.nytimes.com
&t1w=skddk88sd8cea76329 32ca6e83568af8f27c7adfcc61f5cb9513da81152a9ca4
&tli=adkfkaloasd
&cb=123456
&sig=1dd3aeeecfabe2a07007c1029133808efab7b2c7348e3e2eb78f27f16427e6a3
``` where:

```
r    = redirect id generated by tag builder
t1b  = transaction one buyer wallet
t1s  = transaction one seller wallet
t1p  = transaction one payment
t1t  = transaction type (CPM, monthly, whatever)
t2b  = transaction two buyer wallet
t2s  = transaction two seller wallet
t2p  = transaction two payment (CPM)
t2t  = transaction type (CPM, monthly, whatever)
h    = hostname of top level
tlw  = top level wallet
tli  = top level id, generated by publisher js and passed down
cb   = cachebuster
sig  = signature of everything preceding using private key
```

FIG. 2

340 — RECEIVING, FROM A BROWSER APPLICATION EXECUTING ON A COMPUTING DEVICE THAT HAS LOADED THE WEB PAGE, A CONCATENATED PAYMENT BEACON FROM A SECOND DEVICE FOR THE PLACEMENT OF THE DIGITAL ASSET ON THE WEB PAGE, WHERE THE FIRST DEVICE THAT TRANSMITTED THE PAYMENT BEACON TO BID ON THE DIGITAL ASSET WON AN AUCTION FOR THE PLACEMENT OF THE DIGITAL ASSET ON THE WEB PAGE, AND WHERE THE CONCATENATED BEACON INCLUDES THE WALLET IDENTIFIER ASSOCIATED WITH THE BUYER ACCOUNT, THE WALLET IDENTIFIER ASSOCIATED WITH THE EXCHANGE ACCOUNT, THE FIRST TRANSACTION AMOUNT, THE PRIVATE KEY ASSOCIATED WITH THE BUYER ACCOUNT, A SECOND TRANSACTION AMOUNT BETWEEN THE EXCHANGE ACCOUNT AND THE BUYER ACCOUNT, THE WALLET IDENTIFIER ASSOCIATED WITH A SELLER ACCOUNT FROM THE PLURALITY OF SELLER ACCOUNTS, AND THE PRIVATE KEY ASSOCIATED WITH THE EXCHANGE ACCOUNT http://payment.server.com/?t1b=BuyerWallet&t1s=Exchange&t1p=20&cb=cacheBuster&sig=BuyerSignature&t1b=ExchangeWallet&t1s=BuyerWallet&t1p=$14.99&t2b=ExchangeWallet&t2s=Seller&t2p=$1.00&cb=cacheBuster&sig=ExchangeSignature 350 — MATCHING THE CONCATENATED PAYMENT BEACON RECEIVED FROM THE SECOND DEVICE WITH THE PAYMENT BEACON RECEIVED FROM THE FIRST DEVICE 360 — DETERMINING WHETHER A PORTION OF THE PAYMENT BEACON RECEIVED FROM THE FIRST DEVICE HAS BEEN MODIFIED IN THE CONCATENATED PAYMENT BEACON RECEIVED FROM THE SECOND DEVICE 370 — IN RESPONSE TO DETERMINING THAT THE PAYMENT BEACON HAS NOT BEEN MODIFIED, STORING THE CONCATENATED PAYMENT BEACON IN THE CRYPTOGRAPHIC LEDGER, WHERE A FIRST SECURE TRANSACTION IS GENERATED FROM THE FIRST DEVICE HAVING THE WALLET IDENTIFIER TO THE SECOND DEVICE HAVING THE WALLET IDENTIFIER, WHEREIN A SECOND SECURE TRANSACTION IS GENERATED FROM THE SECOND DEVICE HAVING THE WALLET IDENTIFIER TO THE FIRST DEVICE HAVING THE WALLET IDENTIFIER, AND A THIRD SECURE TRANSACTION IS GENERATED FROM THE SECOND DEVICE HAVING THE WALLET IDENTIFIER TO A THIRD DEVICE HAVING THE WALLET IDENTIFIER AND ASSOCIATED WITH THE DIGITAL ASSET THAT HAS BEEN PLACED ON THE WEB PAGE

FIG. 4

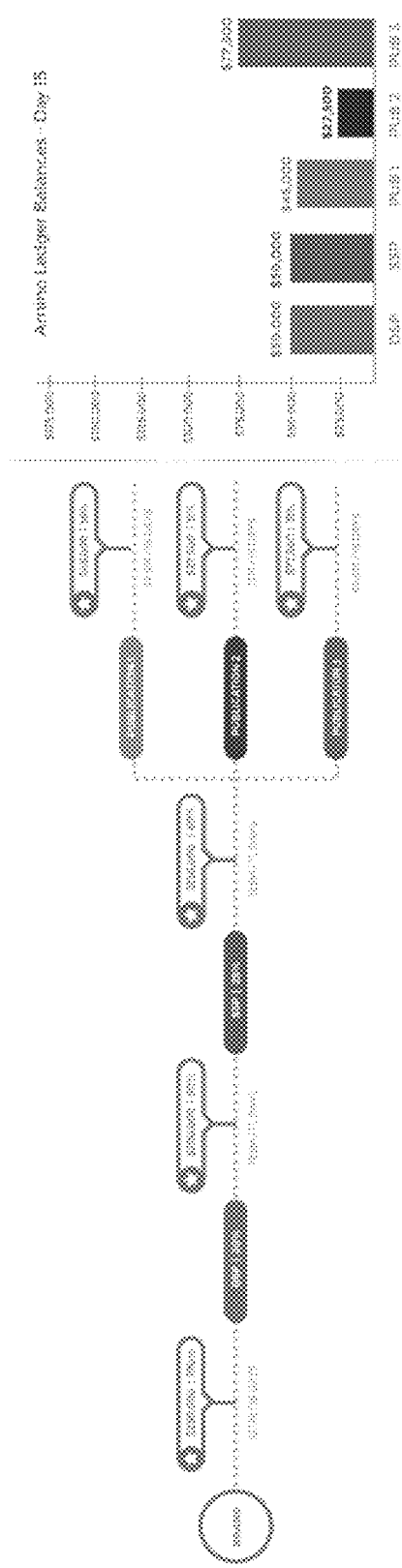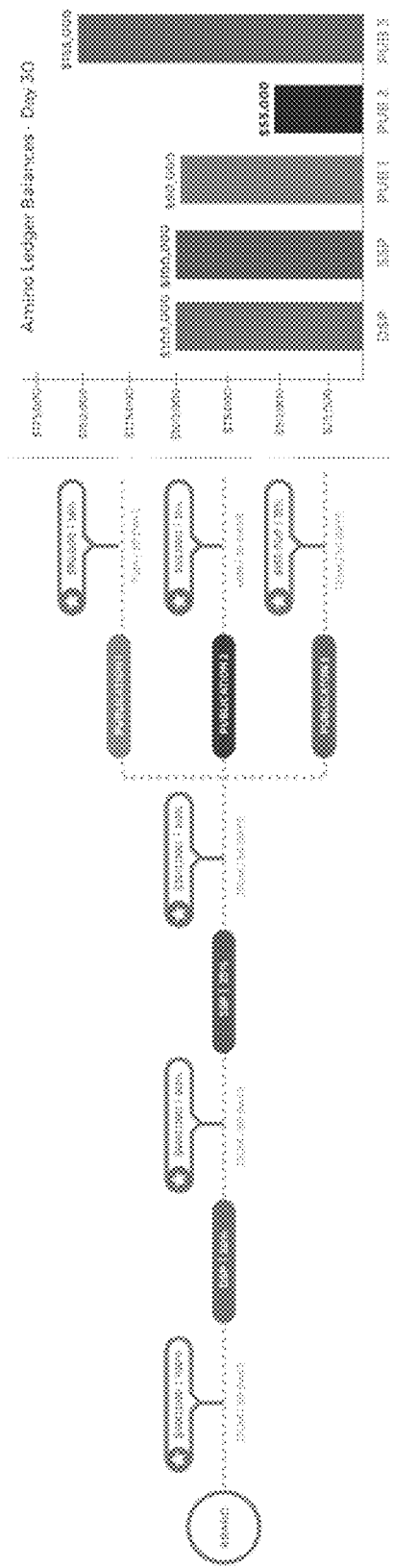
FIG. 5

US 10,885,523 B1

METHODS, SYSTEMS, AND MEDIA FOR PROTECTING TRANSACTIONS WITH SECURE PAYMENT AUTHORIZATION CHANNELS

CROSS-REFERENCE TO RELATED APPLICATIONS

This application claims the benefit of U.S. Provisional Patent Application No. 62/482,581, filed Apr. 6, 2017, which is hereby incorporated by reference herein in its entirety.

TECHNICAL FIELD

The disclosed subject matter relates to methods, systems, and media for protecting transactions with secure payment authorization channels. More particularly, the disclosed subject matter can provide secure payment authorization channels for protecting transactions in connection with the transmission of a digital asset.

BACKGROUND

Media content, such as advertisements, is created with the goal of having the content viewed, listened to, or otherwise received by a particular audience. The ad ecosystem, however, is particularly complex in that it typically includes interactions between a number of different entities—e.g., 1) agencies or media management systems involved in creative development, media planning, campaign management, brand asset management, and/or media buying, 2) publishers and other users involved in content creation, 3) publishers, ad networks, digital media exchanges, demand side platforms, sell side platforms, and agency trading desks involved in media vending, 4) ad servers involved in execution technologies to distribute ads, track their specific placements, and report back on counts of ads delivered, 5) data management platforms, data suppliers, tag management systems, and verification systems involved in media enhancements that, for example, process, integrate, and/or implement information from various data sets, and/or 6) media attribution services, reporting and analytics services, and site measurement and analytics services involved in business intelligence, such as obtaining a view of overall ad spending, conversion to a sale, etc.

Some combination of these entities and, in some cases, all of these entities are involved in the placement of a single advertisement on a web page. These entities and, more particularly, publishers continue to criticize the complexity of the ad placement process and the number of entities involved in the ad placement process, thereby resulting in an overall lack of visibility in how an ad dollar is being spent. For example, a publisher can typically see the clearing price on an exchange and the exchange's fees. In another example, a media buyer can typically see the clearing price on a demand-side platform. In yet another example, the lack of transparency in the advertisement supply chain allows publishers to capture only about 45% of the entire campaign spend, where publishers are not always able to see which advertiser purchased their inventory or the price paid.

In terms of percentages, some sources believe that 70% of an ad dollar can be spent prior to reaching the publisher—i.e., a brand can use the services of an agency to place advertisements, run campaigns, or otherwise promote the brand, where the brand's agency can charge 5%; the brand's agency can use a trade desk that takes a 15% cut, a media buying platform can charge 10%, the brand's agency can use services that provide additional information on the advertisements, such as viewability information and attribution information, for another charge of 25%, and a supply side platform can charge 15%. This particular example would leave 30% of the ad dollar to the publisher. It should be noted that this breakdown on how an ad dollar is allocated varies significantly between the perspectives of brands, publishers, advertisement networks, an ad tech companies. Simply reducing the number of entities involved in these transactions does not solve this problem.

Moreover, in addition to the fogginess of prices that are paid from the brand to the publisher, such as the price an agency has paid for paid for media inventory, this transaction is further complicated in that some agencies can receive rebates from media companies and conflicts of interest can arise from agencies' investments.

Thus, it is desirable to provide methods, systems, and media that overcome these and other deficiencies of the prior art.

For example, it is desirable to provide new methods, systems, and media for protecting transactions with secure payment authorization channels.

In another example, it is desirable to provide new methods, systems, and media for using secure payment authorization channels to provide a transparent payment system between the multiple devices involved in a single ad transaction, where an audit can be visibly presented from a publisher that presents content to an advertiser that creates advertising content and including any intermediary entities.

In yet another example, it is desirable to provide new methods, systems, and media for using secure payment authorization channels to provide fast, instantaneous payments to the multiple devices involved in one or more ad transactions relative to the payment terms and payment delays between particular entities in each ad transaction.

SUMMARY

In accordance with some embodiments of the disclosed subject matter, methods, systems, and media for protecting transactions with secure payment authorization channels are provided.

In accordance with some embodiments, a method for authorization of a secure transaction in connection with transmitting digital assets is provided, the method comprising: storing, in an account database of a server, a plurality of accounts that includes a plurality of buyer accounts, a plurality of seller accounts, and a plurality of exchange accounts, wherein each of the plurality of accounts is associated with a wallet identifier and a private key; receiving, using the server, a payment beacon from a first device to bid on a digital asset for placement on a web page, wherein the payment beacon includes the wallet identifier associated with a buyer account from the plurality of buyer accounts, the wallet identifier associated with an exchange account from the plurality of exchange accounts, a first transaction amount between the buyer account and the exchange account, and the private key associated with the buyer account; storing, using the server, the payment beacon in a cryptographic ledger; receiving, from a browser application executing on a computing device that has loaded the web page, using the server, a concatenated payment beacon from a second device for the placement of the digital asset on the web page, wherein the first device that transmitted the payment beacon to bid on the digital asset won an auction for the placement of the digital asset on the web page, and wherein the concatenated payment beacon includes the wallet identifier associated with the buyer account, the wallet identifier associated with the exchange account, the first transaction amount, the private key associated with the buyer account, a second transaction amount between the exchange account and the buyer account, the wallet identifier associated with a seller account from the plurality of seller accounts, and the private key associated with the exchange account; matching, using the server, the concatenated payment beacon received from the second device with the payment beacon received from the first device; determining, using the server, whether a portion of the payment beacon received from the first device has been modified in the concatenated payment beacon received from the second device; in response to determining that the payment beacon has not been modified, storing, using the server, the concatenated payment beacon in the cryptographic ledger, wherein a first secure transaction is generated from the first device having the wallet identifier to the second device having the wallet identifier, wherein a second secure transaction is generated from the second device having the wallet identifier to the first device having the wallet identifier, and a third secure transaction is generated from the second device having the wallet identifier to a third device having the wallet identifier and associated with the digital asset that has been placed on the web page; and conducting, using the server, at least the first secure transaction with a payment account associated with the wallet identifier of the first device.

In some embodiments, the method further comprises invalidating the first secure transaction, the second secure transaction, and the third secure transaction in response to determining that the payment beacon received from the first device has been modified.

In some embodiments, the method further comprises: transmitting code to a publisher device that is injected into the web page; determining whether top level domain information of the web page is deemed visible by the injected code; and, in response to determining that the top level domain information of the web page is not deemed to be visible by the injected code, generating an indication that code injected into the web page for the placement of the digital asset is likely to have been placed within a nested frame and inhibiting the code from placing the digital asset into the web page.

In some embodiments, the method further comprises: determining whether the private key associated with the buyer account in the payment beacon, the private key associated with the buyer account in the concatenated payment beacon, or the private key associated with the exchange account in the concatenated payment beacon matches a corresponding private key in the account database; and, in response to determining that one of the private key associated with the buyer account in the payment beacon, the private key associated with the buyer account in the concatenated payment beacon, and the private key associated with the exchange account in the concatenated payment beacon does not match a corresponding private key in the account database, invalidating the first secure transaction, the second secure transaction, and the third secure transaction.

In some embodiments, the method further comprises: determining whether the concatenated payment beacon correctly appended an additional transaction to the payment beacon received from the first device; and in response to determining that the concatenated payment beacon did not correctly append the additional transaction to the payment beacon, invalidating the concatenated payment beacon.

In some embodiments, the method further comprises: receiving, from the first device, a request to register for one of the plurality of accounts; and in response to receiving the request, transmitting, to the first device, the wallet identifier and the private key that authorizes secure transactions using the wallet identifier.

In accordance with some embodiments of the disclosed subject matter, a system for authorization of a secure transaction in connection with transmitting digital assets is provided, the system comprising a memory and a hardware processor that, when executing computer executable instructions stored in the memory, is configured to: store, in an account database, a plurality of accounts that includes a plurality of buyer accounts, a plurality of seller accounts, and a plurality of exchange accounts, wherein each of the plurality of accounts is associated with a wallet identifier and a private key; receive a payment beacon from a first device to bid on a digital asset for placement on a web page, wherein the payment beacon includes the wallet identifier associated with a buyer account from the plurality of buyer accounts, the wallet identifier associated with an exchange account from the plurality of exchange accounts, a first transaction amount between the buyer account and the exchange account, and the private key associated with the buyer account; store the payment beacon in a cryptographic ledger; receive, from a browser application executing on a computing device that has loaded the web page, a concatenated payment beacon from a second device for the placement of the digital asset on the web page, wherein the first device that transmitted the payment beacon to bid on the digital asset won an auction for the placement of the digital asset on the web page, and wherein the concatenated payment beacon includes the wallet identifier associated with the buyer account, the wallet identifier associated with the exchange account, the first transaction amount, the private key associated with the buyer account, a second transaction amount between the exchange account and the buyer account, the wallet identifier associated with a seller account from the plurality of seller accounts, and the private key associated with the exchange account; match the concatenated payment beacon received from the second device with the payment beacon received from the first device; determine whether a portion of the payment beacon received from the first device has been modified in the concatenated payment beacon received from the second device; in response to determining that the payment beacon has not been modified, store the concatenated payment beacon in the cryptographic ledger, wherein a first secure transaction is generated from the first device having the wallet identifier to the second device having the wallet identifier, wherein a second secure transaction is generated from the second device having the wallet identifier to the first device having the wallet identifier, and a third secure transaction is generated from the second device having the wallet identifier to a third device having the wallet identifier and associated with the digital asset that has been placed on the web page; and conduct at least the first secure transaction with a payment account associated with the wallet identifier of the first device.

In accordance with some embodiments of the disclosed subject matter, a non-transitory computer-readable medium containing computer-executable instructions that, when executed by a processor, cause the processor to perform a method for authorization of a secure transaction in connection with transmitting digital assets is provided, the method comprising: storing, in an account database of a server, a plurality of accounts that includes a plurality of buyer accounts, a plurality of seller accounts, and a plurality of exchange accounts, wherein each of the plurality of accounts is associated with a wallet identifier and a private key; receiving, using the server, a payment beacon from a first device to bid on a digital asset for placement on a web page, wherein the payment beacon includes the wallet identifier associated with a buyer account from the plurality of buyer accounts, the wallet identifier associated with an exchange account from the plurality of exchange accounts, a first transaction amount between the buyer account and the exchange account, and the private key associated with the buyer account; storing, using the server, the payment beacon in a cryptographic ledger; receiving, from a browser application executing on a computing device that has loaded the web page, using the server, a concatenated payment beacon from a second device for the placement of the digital asset on the web page, wherein the first device that transmitted the payment beacon to bid on the digital asset won an auction for the placement of the digital asset on the web page, and wherein the concatenated payment beacon includes the wallet identifier associated with the buyer account, the wallet identifier associated with the exchange account, the first transaction amount, the private key associated with the buyer account, a second transaction amount between the exchange account and the buyer account, the wallet identifier associated with a seller account from the plurality of seller accounts, and the private key associated with the exchange account; matching, using the server, the concatenated payment beacon received from the second device with the payment beacon received from the first device; determining, using the server, whether a portion of the payment beacon received from the first device has been modified in the concatenated payment beacon received from the second device; in response to determining that the payment beacon has not been modified, storing, using the server, the concatenated payment beacon in the cryptographic ledger, wherein a first secure transaction is generated from the first device having the wallet identifier to the second device having the wallet identifier, wherein a second secure transaction is generated from the second device having the wallet identifier to the first device having the wallet identifier, and a third secure transaction is generated from the second device having the wallet identifier to a third device having the wallet identifier and associated with the digital asset that has been placed on the web page; and conducting, using the server, at least the first secure transaction with a payment account associated with the wallet identifier of the first device.

In accordance with some embodiments of the disclosed subject matter, a system for authorization of a secure transaction in connection with transmitting digital assets is provided, the system comprising: means for storing, in an account database, a plurality of accounts that includes a plurality of buyer accounts, a plurality of seller accounts, and a plurality of exchange accounts, wherein each of the plurality of accounts is associated with a wallet identifier and a private key; means for receiving a payment beacon from a first device to bid on a digital asset for placement on a web page, wherein the payment beacon includes the wallet identifier associated with a buyer account from the plurality of buyer accounts, the wallet identifier associated with an exchange account from the plurality of exchange accounts, a first transaction amount between the buyer account and the exchange account, and the private key associated with the buyer account; means for storing the payment beacon in a cryptographic ledger; means for receiving, from a browser application executing on a computing device that has loaded the web page, a concatenated payment beacon from a second device for the placement of the digital asset on the web page, wherein the first device that transmitted the payment beacon to bid on the digital asset won an auction for the placement of the digital asset on the web page, and wherein the concatenated payment beacon includes the wallet identifier associated with the buyer account, the wallet identifier associated with the exchange account, the first transaction amount, the private key associated with the buyer account, a second transaction amount between the exchange account and the buyer account, the wallet identifier associated with a seller account from the plurality of seller accounts, and the private key associated with the exchange account; means for matching the concatenated payment beacon received from the second device with the payment beacon received from the first device; means for determining whether a portion of the payment beacon received from the first device has been modified in the concatenated payment beacon received from the second device; means for storing the concatenated payment beacon in the cryptographic ledger in response to determining that the payment beacon has not been modified, wherein a first secure transaction is generated from the first device having the wallet identifier to the second device having the wallet identifier, wherein a second secure transaction is generated from the second device having the wallet identifier to the first device having the wallet identifier, and a third secure transaction is generated from the second device having the wallet identifier to a third device having the wallet identifier and associated with the digital asset that has been placed on the web page; and means for conducting at least the first secure transaction with a payment account associated with the wallet identifier of the first device.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIG. 2 shows an illustrative example of a payment pixel code or a payment beacon in accordance with some embodiments of the disclosed subject matter.

FIG. 4 shows an illustrative process for receiving a concatenated payment beacon and determining whether to process secure transactions in accordance with some embodiments of the disclosed subject matter.

FIG. 5 shows an illustrative example of a cryptographic ledger at particular time points in accordance with some embodiments of the disclosed subject matter.

DETAILED DESCRIPTION

Figure 1A:
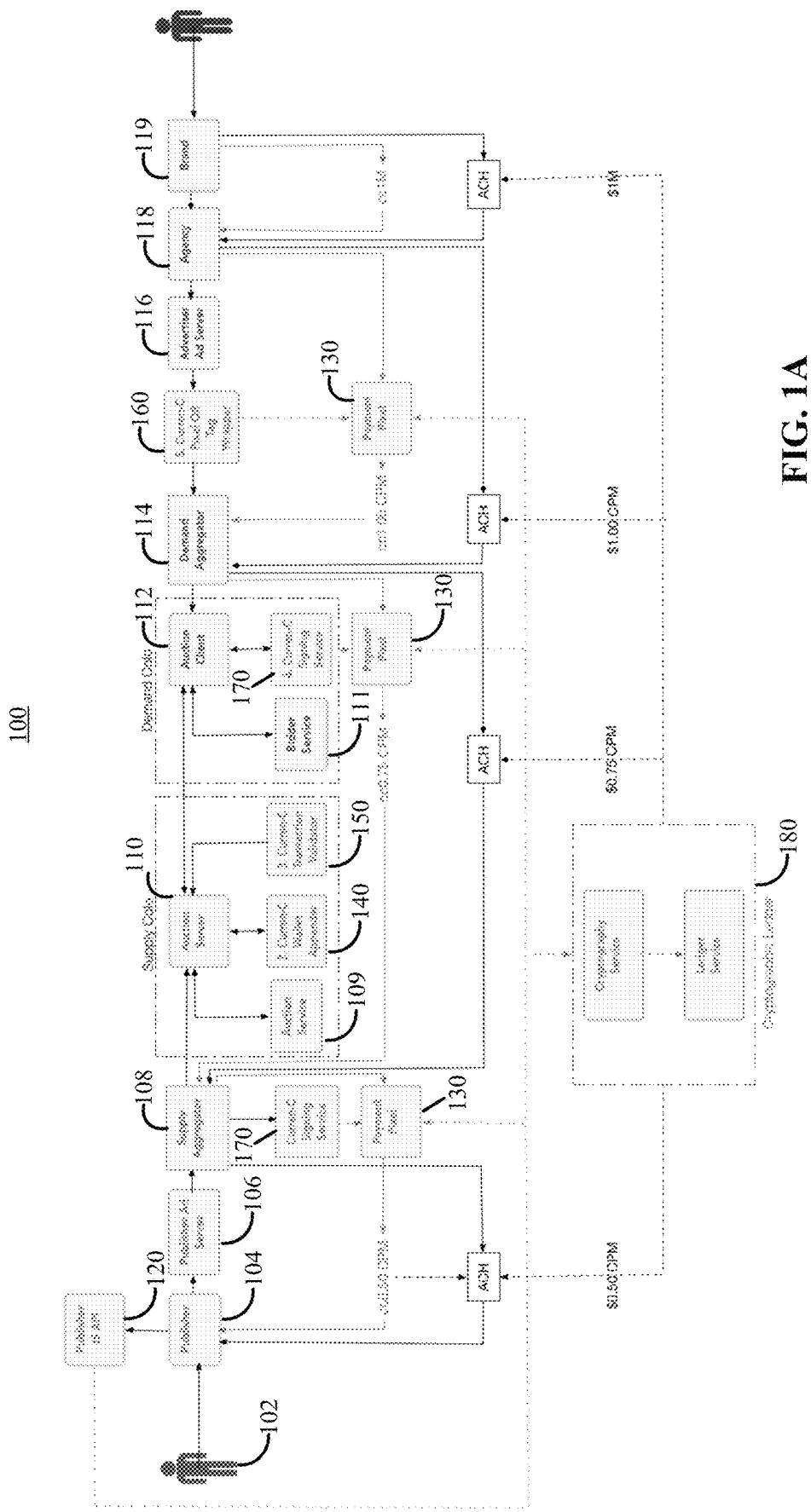
FIGS. 1A-1C shows an illustrative example of a flow diagram for providing secure payment authorization channels for protecting transactions in connection with the transmission of a digital asset in accordance with some embodiments of the disclosed subject matter.

In accordance with various embodiments of the disclosed subject matter, mechanisms (which can include methods, systems, and media) for protecting transactions with secure payment authorization channels. For example, these mechanisms can provide secure payment authorization channels for protecting transactions in connection with the transmission of a digital asset.

By implementing various components on a publisher device, an ad server device, and other devices in a transaction, the mechanisms can open secure payment authorization channels between devices in the transaction, where multiple buyer-seller transactions made in response to a content placement opportunity can be recorded and cryptographically signed within a payment pixel. It should be noted that payment code in the form of a payment pixel can be appended or otherwise inserted into an advertisement call, where the payment pixel can communicate with monitoring code executing on a publisher's web page. For example, each of these multiple buyer-seller transactions can be recorded in a payment pixel with buyer wallet information (e.g., a wallet identifier associated with the buyer for obtaining funds), seller wallet information (e.g., a wallet identifier associated with the seller for depositing funds), payment amount information (e.g., an amount in dollars, an amount in a particular cryptocurrency, etc.), transaction type information (e.g., CPM, monthly, etc.), signature information (e.g., key information), etc.

In some embodiments, the mechanism can include an account database that stores multiple buyer accounts, multiple seller accounts, and multiple exchange accounts, where each account includes at least a wallet identifier associated with the account and a signature or private key information. It should be noted that a wallet identifier can represent a wallet with, for example, a string of alphanumeric characters, where a unique wallet identifier is assigned to an account in response to registration with the secure payment authorization mechanisms. In addition to the wallet identifier, a wallet can be associated with a signature or other suitable private key information that authorizes moving value from one entity to another by cryptographically signing transactions between the entities. Each wallet can also be associated with a corresponding merchant account, which can, in turn, be associated with a bank account. This can, for example, allow values within a cryptographic ledger to be reconciled via bank transactions.

In continuing the above-mentioned example, a buyer associated with a buyer account can submit a bid for a digital asset on an exchange by constructing a payment beacon that includes one or more transaction details, a wallet identifier associated with a wallet of the buyer, and a signature or private key information associated with the buyer. In a more particular example, the payment beacon can be constructed as an HTTPS call to a server, such as: http://payment.server-.com/?t1b=BuyerWallet&t1s=Exchange&t1p=20&cb=cacheBuster&sig=BuyerSignature.

It should be noted that, in some embodiments, any portion of the payment beacon cannot be modified, thereby ensuring that the buyer authorized a payment for a transaction having these one or more transaction details. In response to detecting that a portion of information within the payment beacon has been changed, the mechanisms can invalidate the signature or private key information associated with the payment beacon.

In response, an exchange can receive the payment beacon from the buyer and other payment beacons from other buyers and can conduct the auction. Upon determining that the buyer that submitted the above-mentioned payment beacon has successfully won the auction at a particular clearing price, the exchange can construct a modified payment beacon to send to the browser application along with the digital asset, which in turn sends the modified payment beacon to a payment server for reflecting in the ledger. In a more particular example, the modified payment beacon can be constructed as an HTTPS call to a server, such as: http://payment.server.com/?t1b=BuyerWallet&t1s=Exchange&t1p=20&cb=cacheBuster&sig=BuyerSignature&t1b=ExchangeWallet&t1s=BuyerWallet&t1p=$14.99&t2b=ExchangeWallet&t2s=Seller&t2p=$1.00&cb=cacheBuster&sig=ExchangeSignature, where, in this example, the Buyer bid $20.00, the Buyer won the auction at a clearing price of $5.01 where the second highest bid was $5.00, the Exchange purchased the digital asset unit from Seller for $1.00.

It should be noted that, in the above example, a single payment beacon can contain three transactions (e.g., Buyer sends $20.00 to Exchange, Exchange sends $14.99 to Buyer, Exchange sends $1.00 to Seller) that are cryptographically signed with two private keys (e.g., a signature associated with Buyer and a signature associated with Exchange). That is, the modified payment beacon can be a type of payment beacon that contains multiple payment beacons concatenated into a single HTTPS call.

It should also be noted also that, in some embodiments, verification and, in some cases, payment, can occur instantaneously as the advertisement is placed on the publisher's web page (e.g., as opposed to payment terms that may be negotiated between two of the multiple entities involved in the transaction). In one implementation, this may cause exchanges and bidding servers to accept bid responses from devices using the secure payment authorization channels.

It should further be noted that, in response to a particular transaction being incorrectly signed (e.g., missing wallet container information, incorrect payment signature or key information, etc.), the mechanisms can inhibit the particular transaction from being paid or otherwise accounted. Similarly, in response to a particular transaction being incorrectly signed (e.g., not complying with the secure payment authorization terms), the mechanisms can block or otherwise inhibit an advertisement from being presented on a publisher's web page.

These mechanisms can be used in a variety of applications. For example, upon reviewing an audit trail over the many hops in these transactions, the mechanisms can determine whether a particular sequences of hops is preferable to another (e.g., more cost effective, preferred entities, etc.). In another example, upon extracting transaction information from each payment pixel, the mechanisms can generate a ledger that records the extracted transaction information, which can be presented to a particular entity. In yet another example, these mechanisms can present each entity with instantaneous transaction information, such as winning bid information and cost information.

The ledger can, for example, be a public ledger of all transactions of a blockchain-based currency. One of more computing device (e.g., a buyer device, a seller device, an exchange device, etc.) may comprise a blockchain network, which may be configured to process and record transactions associated with the placement of a digital asset as part of a block in the blockchain. Once a block (e.g., a payment beacon from an account) is constructed, the block can be added to the blockchain and the transaction record can be updated with the added block. In some instances, the blockchain can be a ledger of transactions in chronological order (e.g., from first transaction in time to last transaction in time) or may be organized in any other suitable order. For example, instead of storing a ledger of transaction in chronological order in a blockchain, transactions that are deemed to be high-volume transactions can be stored in a particular blockchain.

Auction Environment

Figure 1B:
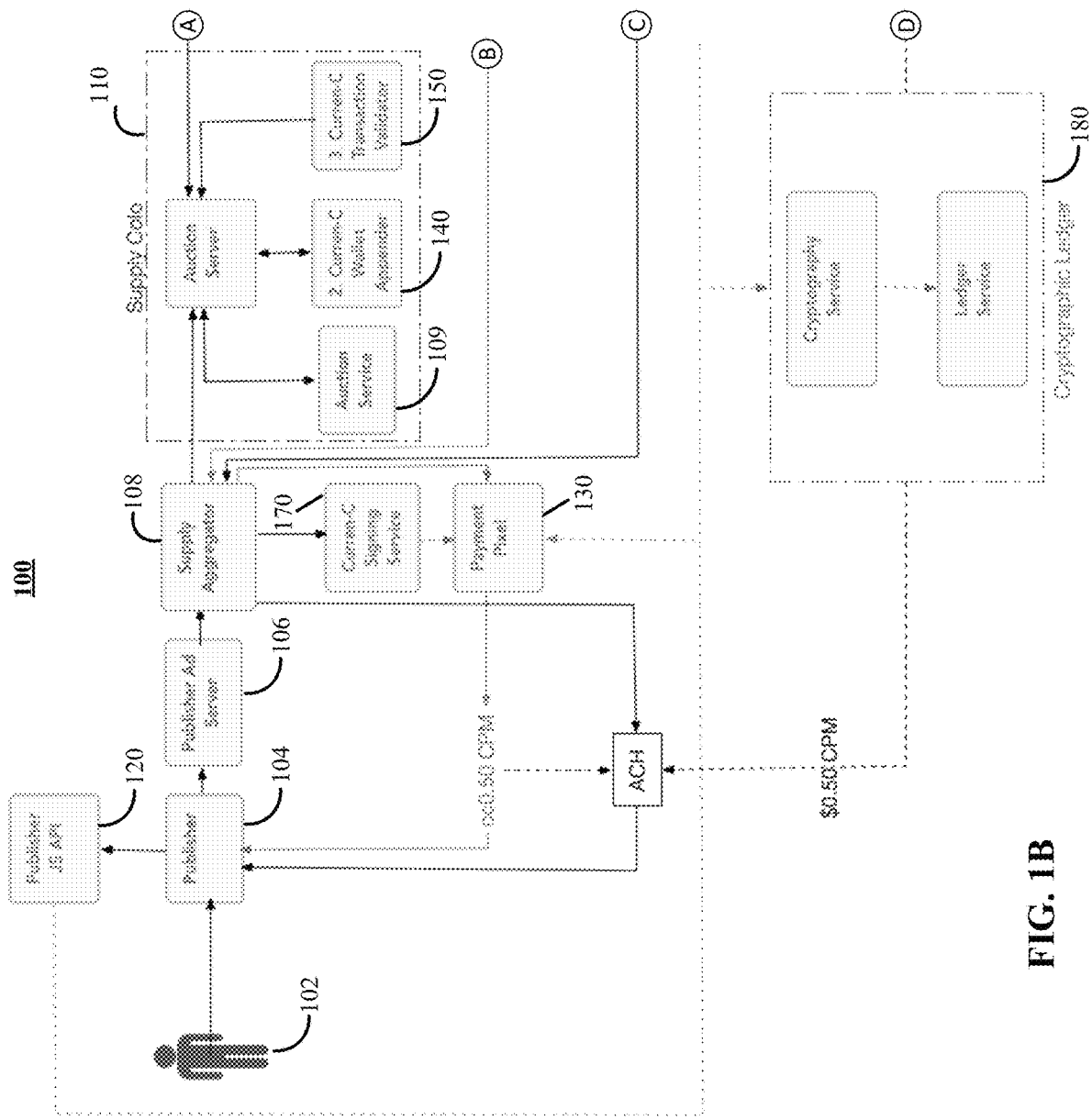
Figure 1C:
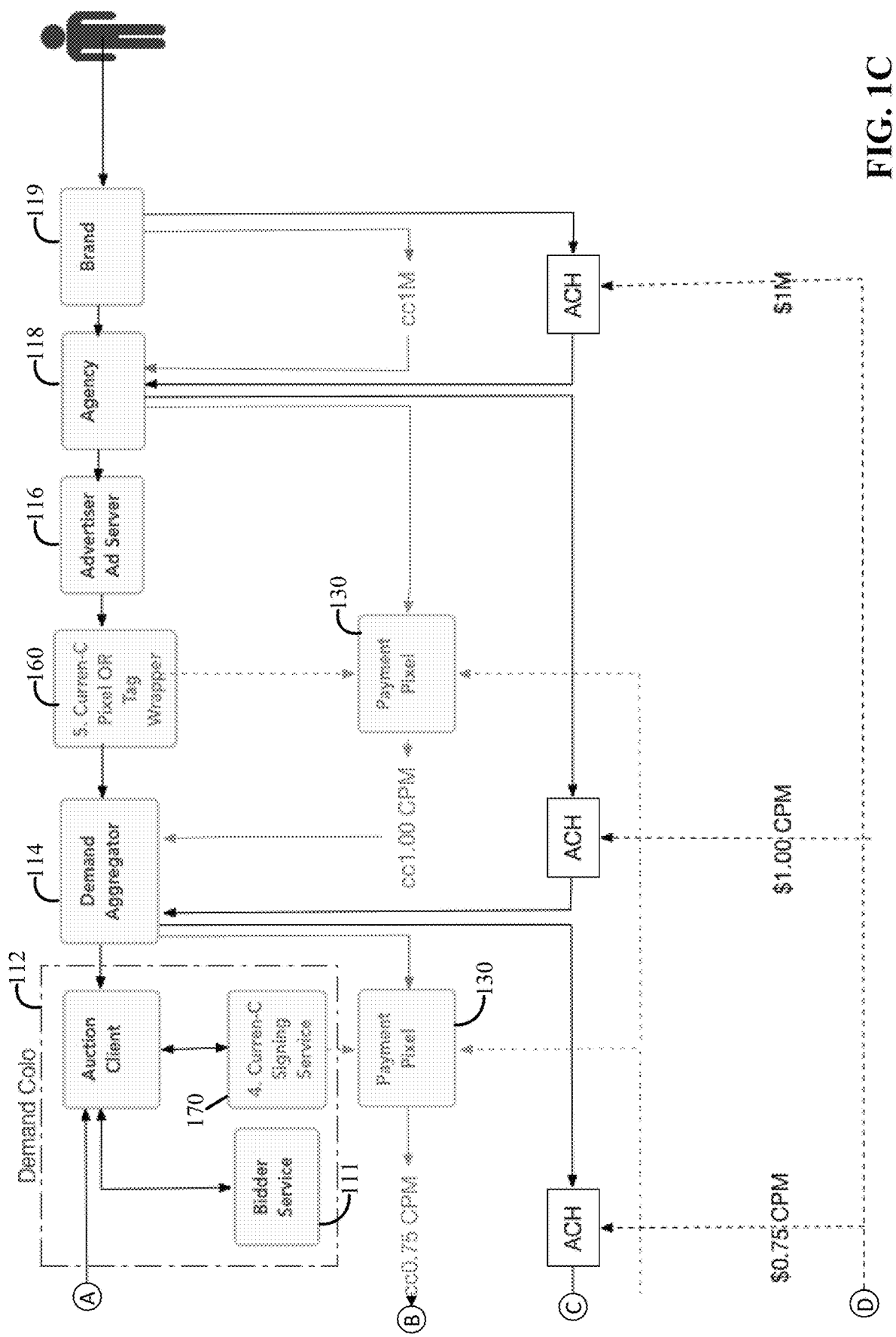

Turning to FIGS. 1A-1C, an illustrative example of a flow diagram 100 for providing secure payment authorization channels corresponding to transmission of a digital asset is shown in accordance with some embodiments of the disclosed subject matter. Note that FIGS. 1B and 1C show enlarged views of flow diagram 100 in FIG. 1A.

It should be noted that, although FIGS. 1A-1C include a number of different devices associated with particular entities in a media transaction (e.g., a brand, an agency, an advertiser ad server, a demand aggregator, an auction client, an auction server, a bidder service, an auction service, a supply aggregator, a publisher ad server, a publisher, etc.), this is merely illustrative. Any suitable entities (including any suitable number of entities) can be used to conduct the media transaction.

One illustrative example can include a media transaction between a brand device and a publisher device (for example, a real-time bidding server implementation or the auction server in the auction environment shown in FIGS. 1A-1C may not be used). In this example, secure communications can be transmitted between a publisher and an ad network in order to directly purchase ad inventory (sometimes referred to as a direct buy).

Another illustrative example can include a media transaction between a computing device 102 and one or more header bidding integrated devices, such as multiple supply side platform devices (sometimes referred to as header bidding). In this example, when the user using the computing device 102 to access a publisher's web page that includes content (including header bidding wrapper code), the header bidding wrapper code can instruct the computing device 102 to asynchronously call multiple supply side platform devices, which each hold bidding services and can respond to the computing device 102. The header bidding wrapper code can obtain the information from the multiple supply side platform devices and can format the information in a request to the ad server. The ad server can, for example, determine the winning bid and respond to the computing device 102 with ad information, such as a redirect to the location of the ad creative. In such an example, secure communications can be transmitted between the computing device, the publisher device, the supply side platforms, and the ad server.

In the auction environment shown in FIGS. 1A-1C, a computing device 102 begins the transaction process by visiting a publisher's web page that can contain any suitable media content using a browser application executing on the computing device 102. In some embodiments, the transaction process can begin in response to a video content item being played back in a media player (e.g., a media player running on a web page, a standalone media player, etc.). In some embodiments, the transaction process can begin in connection with a gaming application executing on the computing device 102 or executing within a browser application running on the computing device 102. Such media content can include any suitable text content, audio content, video content, and/or any suitable combination thereof. In response to visiting the publisher's web page, the browser application executing on the computing device 102 connects with a publisher content server 104, which returns requested content that the browser application interprets and renders as the publisher content. At least a portion of the requested content can include code that represents the opportunity to display an advertisement. For example, such code can include a uniform resource locator (URL) address that directs the browser application to retrieve an advertisement from a publisher ad server 106 or any other ad server that is associated with the publisher 104. The publisher ad server 106 can then, in some embodiments, determine how a particular advertisement should be selected for placement on the publisher's web page.

In continuing this particular example, the ad space on the publisher's web page may not be reserved, for example, for placement of a particular advertisement from a particular advertiser or for a particular opportunity. As such, the publisher ad server 106 can determine that this ad placement opportunity should be placed in an open market environment by connecting with a supply side platform device 108 or any other suitable supply aggregator device. The supply side platform device 108 can, in some embodiments, interface with one or more data provider devices (not shown) that provide supplemental information relating to the user at the computing device 102, supplemental information about the ad placement opportunity provided by the publisher ad server 106, etc. For example, the one or more data provider devices can transmit supplemental information to the supply side platform device 108 to the extent the one or more data provider devices have insight on media content that would be desirable to the computing device 102 that is loading the publisher's web page. In another example, the one or more data provider devices can transmit supplemental information indicating media content, such as advertisements, that have received interest from users similar to the user of the computing device 102. The supply side platform device 108 can then, in turn, transmit the ad request to an ad exchange device, which is represented by an auction server 110.

As described hereinbelow, the auction server 110 can include any suitable components, such as hardware that is running the auction service 109, such as a real-time bidding auction, wallet appender component 140, and transaction validator component 150.

In some embodiments, the auction server 110 can connect and communicate with potential bidding systems, such as auction client device 112, demand side platform device 114, and/or other exchanges. In some embodiments, as shown in FIGS. 1A-1C, the auction server 110 can connect and communicate with an auction system 109 or any other suitable auction service component that operates an auction for the content placement opportunity provided by the sell side platform 108.

In a more particular example, upon connecting and communicating with each of these bidding systems, the auction server 110 can accept bids over a particular period of time for the ad placement opportunity (e.g., ten milliseconds). For example, the auction server 110 can transmit the ad placement opportunity that includes information relating the placement (e.g., information about the publisher, information about the publisher's web page, information about the position of the placement on the web page, viewability information relating to media content on the web page, etc.), information relating to the user using the browser application to load the web page (e.g., information specific to a user account associated with the user, behavioral information regarding users similar to the user, etc.), etc. In continuing this example, in addition to information regarding the ad placement opportunity, the auction server 110 can transmit terms for placing the bid to each of the bidding systems—e.g., a minimum bid price (e.g., in dollars, in cryptocurrency, etc.), a bidding period (e.g., ten milliseconds), a bidding fee, a bid increment, etc.

It should be noted that each auction client 112 can respond to a bid request with an ad location and ad rendering instructions, payment terms, and a tracking pixel or other suitable code. In response to winning the auction, these instructions can be used to retrieve the tracking pixel, which communicates with the winning bidder's ad server at the ad location, thereby registering the winning bid and updating the corresponding accounting information. As described in further detail below, the payment pixel described herein can be connected to or executed concurrently with the tracking pixel.

In continuing this example, the auction server 110 can determine a winning bid from the multiple bids received for the particular ad placement opportunity and transmit a notification to the bidding system, such as demand supply platform device 114. The winning demand side platform device 114 can transmit instructions to the auction server 110 for retrieving the ad creative from the ad server 116 and, in turn, the auction server 110 can transmit those instructions for retrieving the ad creative from the ad server 116 to the supply side platform device 108. The supply side platform device 108 can transmit the instructions to retrieve the ad creative to the publisher ad server 106. The publisher ad server 106 can transmit a response to the still-open HTTP connection with the computing device 102 and directs the browser application executing on the computer device 102 to the agency ad server 116 for obtaining the ad. The agency ad server 116 can, in some embodiments, track ad performance for advertisers.

It should be noted that, in response to retrieving the ad, the agency ad server 116 can inject one or more tracking pixels into the ad response, which can also communicate with demand aggregator 114 and/or other devices.

As also shown in FIGS. 1A-1C, the agency ad server 116 or other suitable ad server can be connected to an agency device 118, which can be managing and/or coordinating ad creatives and ad campaigns created by a brand 119. In some embodiments, the ad creatives and ad campaigns can be created by the agency device 118 on behalf of the brand 119.

As a result, the web browser executing on the computing device 102 can render the ad within the webpage content of the publisher's web page.

It should be noted that, in the conventional advertisement auctioning environment, many of the entities within the transaction have no knowledge of the winning bidder, much less the costs associated with each of the entities in delivering the ad creative to the publisher's web page. Rather, a tracking pixel or other suitable code executes when the ad is placed and only the entity in control of the tracking pixel obtains knowledge of the winning bid when the tracking pixel communicates with the advertisement server when the ad is run.

Auction Environment with Secure Payment Authorization Channels

In accordance with the disclosed subject matter, the mechanisms described herein can include modifying the publishing content server 104 to create secure payment authorization channels with devices in the transaction. These mechanisms can provide secure payment authorization channels between the multiple devices in an ad transaction, where digitally encrypted signing can occur at each hop within the ad transaction. More particularly, these mechanisms can also provide secure payment authorization channels that communicate with a cryptographic ledger server or any other suitable secure authorization server with wallet information, payment information, transaction type information, device information, signature information (e.g., private key information), etc.

Turning to FIGS. 1A-1C, the mechanisms implemented on a secure authorization server 180 can begin by transmitting code to the publisher content server 104 that causes the publisher content server 104 to inject code (e.g., Publisher JavaScript API 120) into its web pages. In some embodiments, the code provided to the publisher device 104 can cause the publisher device 104 to inject code into a publisher's web page that can communicate to other devices also originating from a secure authorization server, such as the cryptographic ledger server 180 shown in FIGS. 1A and 1B. It should be noted that, additionally or alternatively to the web page embodiment described herein, the code can be injected into a gaming application, a media playback application, or any other suitable application. It should also be noted that, although the code described in some of the embodiments is JavaScript code, any suitable code can be injected (e.g., the code can be injected into the publisher content, the code using the software development kit associated with a gaming application can be injected into a portion of the gaming application, the code can be injected into a media stream that provides video content, etc.).

Additionally or alternatively, the code can wait on the page for payment information and understand that it is currently executing on a particular page (URL), can identify and transmit the wallet information (e.g., a wallet identifier) for the publisher device 104, and can transmit responses to payment instructions (e.g., payment to another wallet associated with another device via another wallet identifier. Such other devices can include, for example, an auction server, an auction client, etc.

Such content can include, for example, one or more advertisements. The advertisements can include text advertisements, video advertisements, etc. In a more particular example, the publisher device 104 can inject a portion of JavaScript code that is associated with a publisher into a header portion of the publisher's web page. For example, the portion of JavaScript code can be placed in the header portion of the web page and can respond to requests from other devices within an ad transaction with particular information relating to the web page. It should be noted that, although the example above describes the code as being placed in the header portion of the web page, the code can be provided in any suitable portion of the web page, such as a body portion of the web page or any other suitable location.

As described hereinbelow and as shown in FIGS. 1A-1C, the JavaScript code that is associated with the publisher on the publisher's web page can be implemented as a JavaScript application program interface (API or JS API) 120 that receives these requests from a payment pixel (e.g., payment pixel 130 in FIGS. 1A-1C), a tracking pixel, etc.

that is implemented by a device within an ad transaction. As also shown in FIGS. 1A-1C, the Javascript code can respond to the one or more pixels, such as payment pixels 130, from devices within an ad transaction. As further shown in FIGS. 1A-1C, the Javascript code can communicate transaction information with a secure authorization server, such as cryptographic ledger server 180.

It should be noted that the JavaScript code 120 that is associated with the publisher on the publisher's web page can obtain information relating to what is occurring on the web page and, in turn, can respond to these requests with information including, but not limited to, 1) top level domain information (e.g., a URL associated with the web page), 2) wallet identification information, and 3) a unique identifier associated with a particular page level.

Regarding top level domain information, the JavaScript code 120 that is running on the publisher web page 104 can, in some embodiments, identify and communicate the top level domain information to requestors having corresponding payment pixels or other code. As shown in FIG. 2, such top level domain information can include, for example, a top level identifier that is generated by the JavaScript code 120 that is running on the publisher web page 104 and passed down to corresponding code (e.g., payment pixels). As also shown in FIG. 2, such top level domain information can include, for example, a URL associated with the top level domain.

In some embodiments, this top level domain information can include determining whether the top level domain of the publisher's web page is visible to the JavaScript code 120. For example, if the JavaScript code 120 determines that the top level domain is not visible, the JavaScript code 120 can infer that the code may be placed within a nested iframe. Upon determining that the JavaScript code 120 may be located within a nested iframe, the JavaScript code 120 may be inhibited from determining what other content is being presented on the publisher's web page and from coordinating with content from other iframes on the publisher's web page. In such a case, the JavaScript code 120 may inhibit an opportunity for placing content, such as an advertisement, from being executing using the secure payment authorization channels described herein. In another suitable example, the JavaScript code 120 can transmit other suitable information associated with the web page (e.g., a confirmation of the location of the ad space, a confirmation of the URL for the ad placement opportunity, etc.).

It should also be noted that, in some embodiments, if the JavaScript code 120 determines that the top level domain is not visible or cannot otherwise be determined, the transaction can be invalidated even though a wallet identifier (e.g., the wallet identifier associated with the New York Times publisher device).

In some embodiments, this validation of the transaction can be performed at the secure authorization server, such as the cryptographic ledger server 180 of FIGS. 1A-1C. For example, as described herein, the injected code, such as publisher JS API 120, and payment pixels, such as payment pixels 130, can communicate with the secure authorization server, such as the cryptographic ledger server 180, which coordinates the secure transactions and payment process. In continuing this example, the secure authorization server can validate that the top level domain received from the injected code matches the corresponding wallet identifier. It should also be noted that the injected code (e.g., publisher JS API 120) can generate a unique identifier for the publisher content being loaded at that particular time and can communicate the unique identifier to the secure authorization server 180 and to each of the payment pixels 130.

Regarding wallet identification information, the JavaScript code 120 that is running on the publisher web page can, in some embodiments, determine and communicate a wallet identifier that is associated with a publisher account corresponding to the publisher 104. For example, as shown in FIGS. 1A-1C, a WalletID that is associated with the publisher account can be transmitted in response to content being placed and/or presented on the publisher web page. In another example, as shown in FIGS. 1A-1C, a WalletID that is associated with the publisher account can be transmitted in response to requests from payment pixel 130 at various devices (e.g., a supply aggregator device, an auction client device, an ad agency device, etc.), thereby providing payment visibility across the ad transaction.

In a more particular example, each payment pixel 130, which is digitally signed, can be executing concurrently in nested iframes. As such, each payment pixel 130 can call out or otherwise communicate with the JavaScript code 120 to query whether the payment pixel is located on a valid page. In response, the JavaScript code 120 can respond with information, such as top level domain information, IP address information, or other location information. Additionally, the secure authorization server, such as the cryptographic ledger server 180 of FIGS. 1A-1C, can collect information from the JavaScript code 120 and payment pixels 130, which can include unique identifiers, wallet information, signature information, payment tracking information, and other suitable information, and correlate the JavaScript code 120 associated with the publisher content (or the publisher content at a particular time) and the multiple payment pixels 130. The secure authorization server can determine based on this correlation that the Javascript code 120 and the multiple payment pixels 130 are portion of a single transaction.

It should be noted that JavaScript code 120 can act as a parent to multiple payment pixels 130. In some embodiments, a JavaScript postMessage can be used to implement the code along with the publisher content. Alternatively, in embodiments in which JavaScript has been disabled by a browser application, cookie files can be set with suitable identifiers for execution along with the publisher content.

It should also be noted that, in some embodiments, the secure authorization server, such as cryptographic ledger server 180 in FIGS. 1A-1C, can receive any suitable information, such as timing information, IP address information, user agent information, plug-in information, etc., to determine the combination of injected code 120 and the payment pixels 130 that should be correlated together.

It should be noted that the wallet identification information associated with the publisher account can be used to cryptographically ensure that payments are being routed to the correct accounts and that payments are being routed to verified entities. The wallet identification information (e.g., transaction one buyer wallet (t1b), transaction one seller wallet (t1s), etc. in FIG. 2) can be a public key to a public-private key pair. For example, the wallet identifier (e.g., the tlw field in FIG. 2) can be represented by a public key, where the wallet's owner can hold a secret, paired private key. In a more particular example, as shown in FIG. 2, the wallet identifier can be represented by a string of characters.

It should be noted that any suitable public-key cryptographic mechanism can be used. For example, as described herein, some embodiments implement a public-key cryptographic mechanism in which public keys are disseminated through the ad transaction and corresponding private keys are known only to a wallet's owner. In another example, an elliptic curve cryptographic mechanisms can be used, where elliptic curves are applied to encryption, digital signatures, pseudo-random generators, etc.

Regarding the unique identifier, the JavaScript code 120 that is running on the publisher web page can, in some embodiments, determine and communicate to the payment pixels 130 and the secure authorization server 180 a unique identifier that is associated with a particular URL. This can include, for example, a top level identifier that is generated by the JavaScript 120 code that is running on the publisher web page 104 and passed down to corresponding code (e.g., payment pixels). The unique identifier can also correspond to the page at a particular point in time. It should be noted that the JavaScript code 120 can identify and communicate the URL (and other suitable location information, such as a host name, a path, a query, etc.) to the payment pixels 130 and the secure authorization server 180.

Referring back to FIGS. 1A-1C and as described above, a publisher device 104 can direct a publisher server, such as a publisher advertisement server 106, to provide opportunities to purchase and/or place content, such as advertisements, on a web page associated with the publisher. For example, a publisher, such as the New York Times, can transmit one or more opportunities to place content on a web page associated with the New York Times.

In some embodiments, these content placement opportunities can be transmitted to an open auction environment to receive bids on the content placement opportunities provided by a publisher. In some embodiments, as shown in FIGS. 1A-1C, these content placement opportunities can be transmitted from the publisher ad server 106 to an aggregator server, such as the supply side platform 108. In turn, the supply side platform 108 can transmit the bid request to a real-time bidding server, such as the auction server 110. In a more particular example, the auction server 110 can receive one or more bid requests from one or more publisher servers (e.g., BidRequest messages). In implementing the mechanisms described herein, each of these bid requests (e.g., BidRequest messages) can be modified by appending each bid request with suitable currency wallet information (e.g., WalletID or other suitable wallet identifier). It should be noted that, in some embodiments, particular bid requests that are approved by the secure authorization server 180 are modified with corresponding currency wallet information. For example, the publisher device 104 can select particular bid requests to be transmitted using the secure payment authorization mechanisms described herein, while other bid requests are directed to the bidding server without such wallet information. These placement opportunities can be provided on an interface that allows one or more bidders to transmit bid responses for placing corresponding bids (e.g., BidResponse messages).

It should be noted that, in some embodiments, a wallet identifier can be provided once as opposed to with every transaction. For example, an interface can be provided that indicates the wallet identifier if a user of one of the devices is using the secure authorization server 180. In another example, in response to receiving an indication to use the features of the secure authorization server 180, the secure authorization server 180 can query a database or any other suitable source to determine public keys for associated devices—e.g., the corresponding wallet identifier for a particular device.

In some embodiments, the secure payment authorization mechanisms described herein can include using the secure authorization server to provide a wallet appender service 140. For example, as shown in FIGS. 1A-1C, the secure authorization server has transmitted the wallet appender service 140 to auction server 110. The wallet appender service 140 can, for example, append or otherwise insert wallet identification information (e.g., WalletID) to the bid request. As described above, the wallet identification information can be a public key in a public key cryptography algorithm (e.g., to a public-private key pair). For example, the wallet identification information (e.g., the tlw field in FIG. 2) can be used as a public key, where each device within the transaction can hold a paired private key. In response to appending the wallet identification information to a particular bid request, the devices involved in the transaction can determine the appropriate wallet to place a payment (for example, the wallet corresponding to the publisher on which the ad appears).

It should be noted that the corresponding private key that is associated with a particular device can be used for digitally signing a transaction. For example, a buying entity that is providing a payment or otherwise giving up value can be required to digitally sign a transaction message, while the entity receiving the value may not be required to use their associated private key to digitally sign the transaction message.

In some embodiments, the secure payment authorization mechanisms described herein include using the secure authorization server to provide a transaction validator service 150. For example, as shown in FIGS. 1A-1C, the secure authorization server has transmitted the transaction validator service 140 to auction server 110. The transaction validator service 150 can communicate with the auction server 110 to ensure that a bid response from an auction client or other bidder device is signed correctly, that the bid response is signed by the appropriate parties, and that the wallet receiving the appropriate amount is the correct wallet (e.g., corresponds to their own wallet identification information). For example, in addition to ensuring that funds are transferred to the appropriate currency wallet, the transaction validator service 150 can use the public key associated with a buyer (e.g., an agency device) to verify the payment signature. It should be noted that this validation can be performed prior to the determination of a winning bidder in the auction. As described hereinbelow, in some embodiments, in response to not implementing the secure payment authorization mechanisms (e.g., not providing wallet information, not validating a payment signature, etc.), an advertisement may not be transmitted to a seller in response to an ad placement opportunity.

It should be noted that, in some embodiments, the transaction validator service 150 is not included in the secure payment authorization mechanisms described herein and the secure authorization server 180 can perform such a validation of the transaction. For example, in response to determining that a message is not digitally signed correctly with the corresponding private key, the secure authorization server 180 can invalidate the transaction.

It should also be noted that, in some embodiments, a particular portion of the transactions can be selected for validation. For example, the secure authorization server 180 can determine a value associated with a transaction (e.g., 5/1000ths of a cent, $0.01, etc.) and can rank the multiple transactions occurring at a particular point in time or within a particular time window. In response to ranking the transactions, the secure authorization server 180 can select a particular portion of the ranked transactions for validation— e.g., the top one thousand transactions, the top transactions having a value greater than a particular threshold value, etc.

Additionally or alternatively, for the transactions that have not yet been selected for validation, the secure authorization server 180 can select one or more of these transaction for validation. For example, the secure authorization server 180 can randomly select one transaction out of every five hundred unselected transactions for validation. In continuing this example, in response to invalidating a particular number of transactions associated with a particular device or flagging a particular number of transactions for review as potentially being invalid, the secure authorization server 180 can review the transactions associated with the particular device (e.g., a suspicious auction client). Alternatively, in some embodiments, the secure authorization server 180 can transmit a warning notification to the particular device that their associated transactions are under review or that their ability to submit responses is halted pending a review of their transactions. Upon determining that the particular device is deemed an untrusted device, the secure authorization server 180 can review a ledger and can invalidate the transactions associated with the untrusted device.

Referring back to FIGS. 1A-1C, the agency ad server 116 or other suitable ad server can be connected to an agency device 118, which can be managing and/or coordinating ad creatives and ad campaigns created by a brand 119. The brand, agency, or advertiser can transmit an advertisement call from an ad server 116 to a publisher 104 for associating a particular advertisement or campaign of advertisements with a particular web page. The advertisement call can be any suitable code snippet (e.g., a HyperText Markup Language (HTML) or JavaScript code) from an advertisement network or a publisher to instruct a creative server or any other suitable advertisement server 116 to publish an advertisement on one or more web pages. For example, the ad server 116 can transmit an ad tag that includes a creative URL that directs the broader application to obtain the ad creative from a server that hosts the content.

In some embodiments, the secure payment authorization mechanisms described herein can intercept the ad tag transmitted by the ad server 116 and direct the ad tag to a tag wrapper component 160. In response to intercepting the ad tag, the tag wrapper component 160 can insert or append a payment pixel to the ad tag. For example, the tag wrapper component 160 can insert or append a payment tag or any other suitable code into the advertisement code.

Alternatively, the secure payment authorization mechanisms described herein can provide code (e.g., to the ad server 116) that causes particular ad tags to be redirected to the tag wrapper component 160. For example, the advertisement call can be redirected to the tag wrapper component 160 using a uniform resource locator (URL) redirection instruction into an existing advertisement call and, upon modification by the tag wrapper component 160, can direct the advertisement call onward in the transaction. In a more particular example, the advertisement call can be represented by:

http://adserver.[payment_tag_wrapper_component]/ad-tag, where [payment_tag_wrapper_component] is the domain of the tag wrapper component 160 appended to the advertisement call. For example, if the domain of the tag wrapper component 160 is curren-c.com, the advertisement call can be modified to be:

http://adserver.curren-c.com/adtag.

It should be noted that, in some embodiments, in addition to redirecting the advertisement call to the tag wrapper component 160, the payment pixel can include additional parameters. For example, the parameters can be inserted to indicate a redirect identifier, transaction information (e.g., buyer wallet information, seller wallet information, payment terms, transaction type, etc.), top level wallet information, top level identifier, signature or encryption information, etc. That is, the payment pixel can include, for example, a request to make a payment with the web page associated with the advertisement call.

An illustrative example of a payment pixel, which is also shown in FIG. 2, can be represented by:

http://payment.curren-c.net?
r=trackingpixel.ourpartner.com%3Ft%3D234234%26cid%3D2343%26pid%3D234234
&t1b=c9273f68b5d3020113fd27c0efaac165f2c9d07679
59c31a0ea7b3bfac08b33e
&t1s=eed28849d8cea7632932ca6e83568af8f27c7adfcc6
1f5cb9513da81152a9ca4
&t1p=0.40
&t1t=cpm
&h=www.nytimes.com
&tlw=skddk88sd8cea7632932ca6e83568af8f27c7adfcc6
1f5cb9513da81152a9ca4
&tli=adkfkaloasd
&cb=123456
&sig=1dd3aeeecfabe2a07007c1029133808efab7b2c7348
e3e2eb78f27f16427e6a3 where:
r=redirect id generated by tag builder
t1b=transaction one buyer wallet
t1s=transaction one seller wallet
t1p=transaction one payment
t1t=transaction type (CPM, monthly, whatever)
t2b=transaction two buyer wallet
t2s=transaction two seller wallet
t2p=transaction two payment (CPM)
t2t=transaction type (CPM, monthly, whatever)
h=hostname of top level
tlw=top level wallet
tli=top level id, generated by publisher js and passed down
cb=cachebuster
sig=signature of everything preceding using private key It should be noted that, in some embodiments, a tracking pixel associated with the ad tag can be replaced with a payment pixel 130, which can redirect to the tracking pixel. Alternatively, in some embodiments, the payment pixel can execute alongside the tracking pixel.

Referring back to FIGS. 1A-1C, the bid responses from the auction client device 112 or any other suitable device can include the payment pixel 130. Upon being declared the winning bidder in an auction for an ad placement, the payment pixel 130 is executed (e.g., whether executed client-side by a browser application or server-side by an auction server) with buyer wallet information, seller wallet information, transaction amount information, and transaction type information. In addition, as also shown in FIGS. 1A-1C, the secure payment authorization mechanisms described herein can include a signing service 140. The signing service 140 of the secure payment authorization mechanisms can, for example, wrap, append, or insert a payment pixel 130 (PaymentTrackerPixel) to a tracking pixel (ImpressionTrackerPixel). The signing server 140 can, in some embodiments, sign the payment pixel using the buyer's associated private key with the buyer information. As a result, the buyer and the associated buyer information are authenticated to the seller and other devices in the transaction. Accordingly, the secure payment authorization mechanisms can provide a secure transaction from a buyer's wallet to a seller's wallet.

As shown in FIGS. 1A-1C, when the payment pixel is executed, the payment pixel communicates with the JavaScript code 120 that is executing on the publisher's web page. As such, when the payment pixel lands, it is typically buried under a stack of one or more iframes and generally cannot ascertain where it is located. By opening a communication channel with the JavaScript code 120, the JavaScript code 120 can communicate, among other things, the location of the ad (e.g., located on the New York Times web page) and the wallet identification information associated with the publisher (e.g., the New York Times currency wallet information).

In some embodiments, the payment pixel can inhibit advertisements from appear on web pages in which a currency wallet is not associated with the involved parties. For example, a brand or an agency can provide criterion that requires a currency wallet and associated wallet information to be used in the transaction. In response to the payment pixel or any other suitable component determining that an entity, such as a seller, does not have associated wallet information (e.g., WalletID or any other suitable wallet identifier), the payment pixel can inhibit the ad creative from being provided to the publisher for publication on the publisher's web page.

Note that, although FIGS. 1A-1C shows a number of different payments that are made in a single ad placement transaction, this is merely illustrative. For example, as shown in FIGS. 1A-1C, a payment is made between the brand device 119 and the agency device 118 (e.g., $1 M), between the agency device and the demand side platform device 114 (e.g., $1.00 CPM or cost per thousand), between the demand side platform device 114 and the supply side platform device 108 (e.g., $0.75 CPM), and between the supply side platform device 108 and the publisher device 104 (e.g., $0.50 CPM). In another example, such payments can be made in a direct purchase implementation, where a payment is made between the publisher device 104 and the agency device 118. In yet another example, such payments can be made in a direct purchase implementation, where a payment is made between the publisher device 104 and the brand device 119 (e.g., where the agency device 118 manages ad creatives and ad campaigns for a fee).

Additionally or alternatively, in some embodiments, the secure payment authorization mechanisms described herein can be implemented with a chain or a concatenated payment beacon that contains multiple payment beacons that are concatenated into a single HTTPS call.

Figure 3:
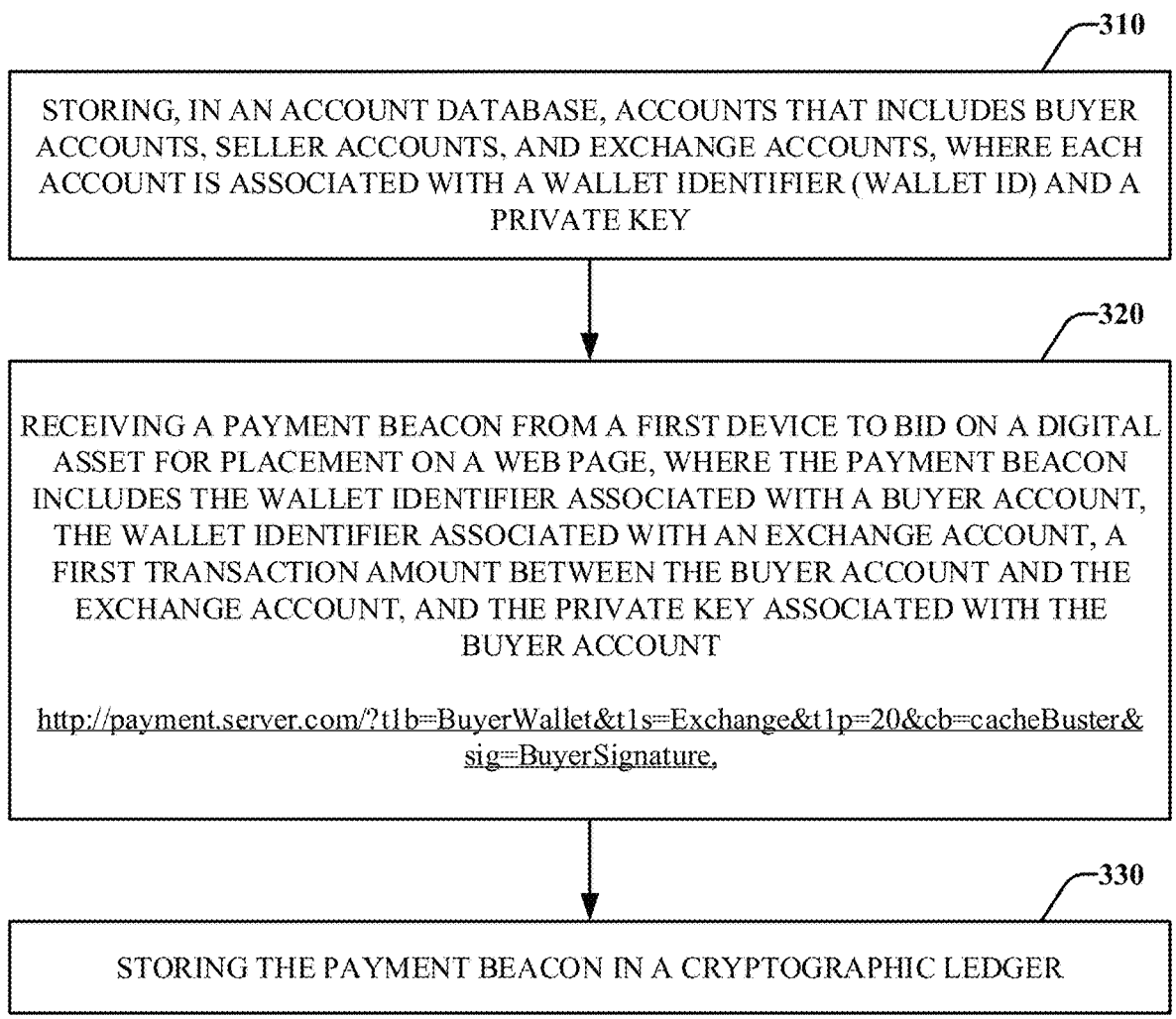
FIG. 3 shows an illustrative process for constructing and receiving a payment beacon in accordance with some embodiments of the disclosed subject matter.

Turning to FIG. 3, in some embodiments, the secure payment authorization mechanisms described herein can include an account database that stores multiple buyer accounts, multiple seller accounts, and multiple exchange accounts at 310. For example, each of these accounts is created in response to registering with a server associated with the secure payment authorization mechanisms.

It should be noted that each account can include at least a wallet identifier associated with the account and a signature or private key information. It should also be noted that a wallet identifier can represent a wallet with, for example, a string of alphanumeric characters, where the wallet identifier is assigned to an account in response to registration with the secure payment authorization mechanisms. In addition to the wallet identifier, a wallet can be associated with a signature or other suitable private key information that authorizes the movement of value (e.g., a grain unit, such as a fractional share of currency, or any other suitable payment amount) from one entity to another by cryptographically signing transactions between the entities. As described herein, each wallet can also be associated with a corresponding merchant account, which can, in turn, be associated with a bank account. This can, for example, allow values within a cryptographic ledger to be reconciled via bank transactions.

In continuing the above-mentioned example, a buyer associated with a buyer account can submit a bid for a digital asset on an exchange by constructing a payment beacon that includes one or more transaction details, a wallet identifier associated with a wallet of the buyer, and a signature or private key information associated with the buyer at 320. In a more particular example, the payment beacon can be constructed as an HTTPS call to a server, such as: http://payment.server.com/?t1b=BuyerWallet&t1s=Exchange&t1p=20&cb=cacheBuster&sig=BuyerSignature,
where:
t1b=transaction one buyer wallet
t1s=transaction one exchange wallet
t1p=transaction one payment
cb=cachebuster
sig=buyer signature using private key information It should be noted that device information that constructed the payment beacon can be captured and associated with the payment beacon. For example, in response to a buyer account constructing a payment beacon, device information corresponding to the buyer device, such as a timestamp, a device identifier, a source address, and other device information, can be captured and appended to the payment beacon.

In some embodiments, the payment beacon is transmitted to the exchange to place a bid on a digital asset. In some embodiments, the payment beacon is also transmitted to a cryptographic ledger to record and store the payment beacon constructed by the buyer and transmitted to the exchange at 330.

It should be noted that, in some embodiments, any portion of the payment beacon cannot be modified, thereby ensuring that the buyer authorized a payment for a transaction having these one or more transaction details. For example, in response to detecting that information within the payment beacon prior to the signature or private key information has been changed, the signature or private key information associated with the payment beacon can be invalidated. As such, the transaction can be invalidated.

In response, an exchange can receive the payment beacon from the buyer and other payment beacons from other buyers and can conduct the auction. Upon determining that the buyer that submitted the above-mentioned payment beacon has successfully won the auction at a particular clearing price, the exchange can construct a modified payment beacon to send to the browser application along with the digital asset, which in turn sends the modified payment beacon to a payment server for reflecting in the ledger. In a more particular example, the modified payment beacon can be constructed as an HTTPS call to a server, such as: http://payment.server.com/?t1b=BuyerWallet&t1s=Exchange&t1p=20&cb=cacheBuster&sig=BuyerSignature&t1b=ExchangeWallet&t1s=BuyerWallet&t1p=$14.99&t2b=ExchangeWallet&t2s=Seller&t2p=$1.00&cb=cacheBuster&sig=ExchangeSignature, where:
- t1b=transaction one buyer wallet (from the payment beacon above)
- t1s=transaction one exchange wallet (from the payment beacon above)
- t1p=transaction one payment (from the payment beacon above)
- cb=cachebuster (from the payment beacon above)
- sig=buyer signature using private key information (from the payment beacon above)
- t1b=transaction one exchange wallet
- t1s=transaction one buyer wallet
- t1p=transaction one payment from the exchange wallet to the buyer wallet
- t2b=transaction two exchange wallet
- t2s=transaction two seller wallet
- t2p=transaction two payment from the exchange wallet to the seller wallet
- cb=cachebuster
- sig=exchange signature using private key information.

In this example, the Buyer bid $20.00, the Buyer won the auction at a clearing price of $5.01 where the second highest bid was $5.00, the Exchange purchased the digital asset unit from Seller for $1.00.

It should be noted that, in the above example, a single payment beacon contains three transactions that is cryptographically signed with two private keys (e.g., Buyer sends $20.00 to Exchange, Exchange sends $14.99 to Buyer, Exchange sends $1.00 to Seller). That is, the modified payment beacon can be a type of payment beacon that contains multiple payment beacons concatenated into a single HTTPS call.

In some embodiments, the browser application executing on a computing device that has loaded the web page can transmit the concatenated payment beacon to the cryptographic ledger at 340. For example, in response to placing the digital asset, such as a content item, on the page loaded by the browser application, the code running on the browser application can transmit information about the placement of the digital asset (e.g., the winning bid and the payment beacon associated with the winning bid) and the concatenated payment beacon to the cryptographic ledger for recordation.

In some embodiments, in response to receiving the concatenated payment beacon, the cryptographic ledger can match the concatenated payment beacon, which was transmitted from the exchange to the computing device and, in turn, from the computing device to the cryptographic ledger, with the payment beacon from the buyer at 350. For example, the cryptographic ledger can perform a search for matching payment beacons that may be related to the received concatenated payment beacon. In another example, the cryptographic ledger can perform a search for corresponding payment beacons including one or more wallet identifiers from the concatenated payment beacon. In yet another example, the cryptographic ledger can determine that the concatenated payment beacon is not to be recorded in the ledger until it matches a portion of the concatenated payment beacon with a received payment beacon (e.g., the payment beacon received from a buyer bidding on the placement of a digital asset).

At 360, the cryptographic ledger can verify whether the payment beacons are valid by determining whether a portion of the payment beacon received from the buyer device or whether a portion of the concatenated payment beacon has been modified. For example, in response to detecting that a payment term has been modified, the entire secure transaction can be invalidated and none of the associated entities can benefit from the processing of the associated secure transactions. In another example, the cryptographic ledger can transmit notifications to at least the buyer account and the exchange account indicating that the secure transaction has been invalidated and that at least a portion of the concatenated payment beacon has been modified. It should be noted that a secure transaction can be invalidated for any suitable reason, such as non-matching private key information, modified payment terms, modified wallet identifier, etc.

In some embodiments, the cryptographic ledger can determine whether the payment beacon constructed by the exchange was properly appended to the payment beacon constructed by the buyer. For example, in response to determining that the payment beacon constructed by the exchange was not properly generated (e.g., missing data, modified data outside of the payment beacon constructed by the exchange, etc.), the cryptographic ledger can invalidate the concatenated payment beacon. For example, the cryptographic ledger can determine that the concatenated payment beacon is not to be recorded in the ledger in response to determining that the payment beacon constructed by the exchange and appended to the payment beacon constructed by the buyer was not properly generated. In another example, the cryptographic ledger can transmit a notification to the exchange account corresponding to the concatenated payment beacon indicating that the payment beacon was not properly generated.

At 370, in response to determining that the payment beacon and the concatenated payment beacon have not been modified, the concatenated payment beacon and the information associated with the concatenated payment beacon can be stored in the cryptographic ledger.

It should be noted that the cryptographic ledger can, for example, be a public ledger of all transactions of a blockchain-based currency. One of more computing devices (e.g., a buyer device, a seller device, an exchange device, etc.) may comprise a blockchain network, which may be configured to process and record transactions associated with the placement of a digital asset as part of a block in the blockchain. Once a block (e.g., a payment beacon from an account) is constructed, the block can be added to the blockchain and the transaction record can be updated with the added block. In some instances, the blockchain can be a ledger of transactions in chronological order (e.g., from first transaction in time to last transaction in time) or may be organized in any other suitable order.

In some embodiments, alternative to storing a ledger of transaction in chronological order in a blockchain, the cryptographic transactions can determine whether a secure transaction is deemed to be a high-volume transaction. For example, in response to determining that a volume associated with one or more transactions is greater than a threshold value, such high-volume transactions can be stored in a particular blockchain.

In some embodiments, in response to recording payment beacons into the cryptographic ledger, the cryptographic ledger can provide user accounts having wallet identifiers with visibility into each transaction associated with the placement of a digital asset. For example, FIG. 5 shows an illustrative example of the cryptographic ledger balances between particular accounts (e.g., DSP, SSP, PUB1, PUB2, and PUB3) at particular time points (e.g., Day 15 and Day 30). This can, for example, provide user interfaces that present information regarding each transaction associated with the placement of digital assets.

In some embodiments, the cryptographic ledger can review the secure transactions and determine a similar transaction having a shorter number of hops. For example, the cryptographic ledger can determine that an exchange account should not transact with a particular entity having a user account. In another example, the cryptographic ledger can determine that a buyer account should not transact with a particular exchange having an exchange account and instead should transact with a different exchange having an exchange account.

Figure 6:
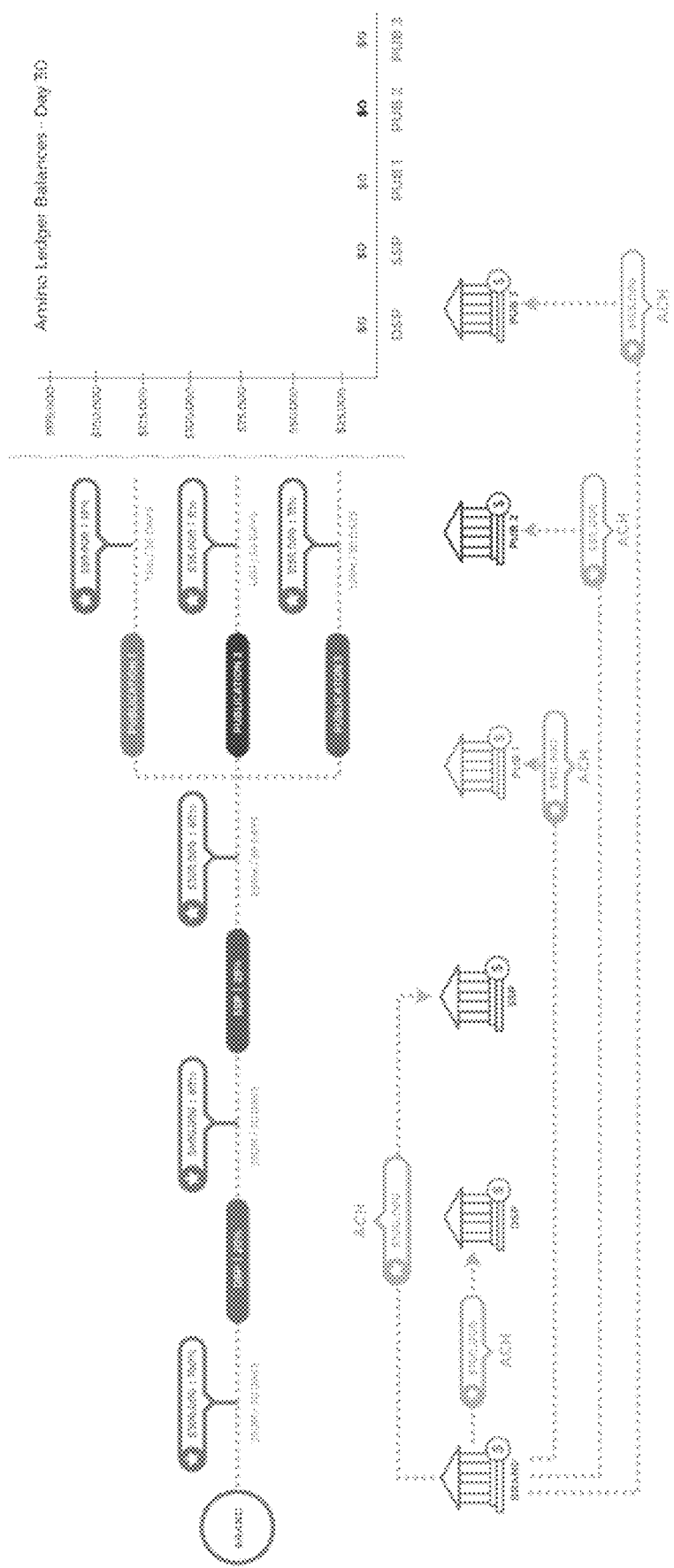
FIG. 6 shows an illustrative example of a cryptographic ledger in which secure transactions are processed in accordance with some embodiments of the disclosed subject matter.

In some embodiments, the cryptographic ledger can initiate the secure transactions with the wallet identifiers associated with each account involved in a transaction. For example, as shown in FIG. 6, secure transactions with the wallet identifiers associated with a particular set of accounts (e.g., DSP, SSP, PUB1, PUB2, and PUB3) are initiated, where the secure transactions are for amounts indicated by the current ledger balances in the cryptographic ledger.

It should be noted that, although the embodiments described herein show payments made in a particular dollar amount, there are merely illustrative. For example, a brand device can pay an agency device in a particular dollar amount for handling a given amount of ad creatives, while a supply side platform device can be paid by a publisher device in a particular cryptocurrency. In another example, the cryptographic ledger can record secure transactions in units, such as grains (e.g., one millionth of a US dollar) or any other suitable fraction of currency.

It should also be noted that, although the embodiments described herein show payments made using a flat fee, the payment can be determined in accordance with a contract between a buyer and a seller. For example, contract terms can be communicated and stored in the cryptographic ledger and referenced using a buyer-seller wallet identifier pair and a contract identifier. In continuing this example, contract terms can be communicated in response to registration with the cryptographic ledger by a buyer account and a seller account (e.g., where the buyer account and the seller account have been previously registered with the cryptographic ledger).

In some embodiments, in addition to securely and visibly communicating payment information for multiple entities in an ad transaction, the mechanisms described herein can provide virtual wallets for each of the devices associated with the ad transaction. It should be noted that the balances in each of the virtual wallets can be configured to be processed at any suitable time.

In some embodiments, a transaction user interface can be presented on a device, where the user interface can include a total balance owed from one or more entities (e.g., one or more brands, one or more agencies, etc.) and can provide an option to reconcile an account associated with one of these entities. For example, the transaction user interface can indicate that a particular auction client that is buying media content for $0.75 CPM and selling the media content for $1.00 CPM now has a virtual balance of $10,000 that is owed by a particular agency. In response to selecting the option to reconcile the account associated with that particular agency, the secure authorization server can initiate a funds transfer from a bank account associated with the particular agency to a bank account associated with the particular auction client. As mentioned above, the secure authorization server can initiate a funds transfer in any suitable currency or cryptocurrency. As also mentioned herein, the secure authorization server can initiate a funds transfer at any suitable time—e.g., in response to receiving a payment element on an interface (e.g., "Pay Now"), at automatic intervals (e.g., once a week, once a month, etc.), upon reaching particular amounts (e.g., every $1,000 earned), etc.

It should be noted that the secure authorization server, which reviews a ledger of the transaction information, can coordinate the funds transfer between devices using the provided wallet identifiers.

It should also be noted that, in some embodiments, such a funds transfer can be initiated in response to reaching a predetermined amount (e.g., $1,000, $10,000, $100,000, etc.).

Alternatively, in some embodiments, such a funds transfer can be initiated at particular time periods (e.g., once a month, once a week on every Friday, etc.).

In some embodiments, at least some of the above described blocks of the processes of FIGS. 1A-1C, 3, and 4 can be executed or performed in any order or sequence not limited to the order and sequence shown in and described in connection with the figures. Also, some of the above blocks of FIGS. 1A-1C, 3, and 4 can be executed or performed substantially simultaneously where appropriate or in parallel to reduce latency and processing times. Additionally or alternatively, in some embodiments, some of the above described blocks of the process of FIGS. 1A-1C, 3, and 4 can be omitted.

System Architecture

Figure 7:
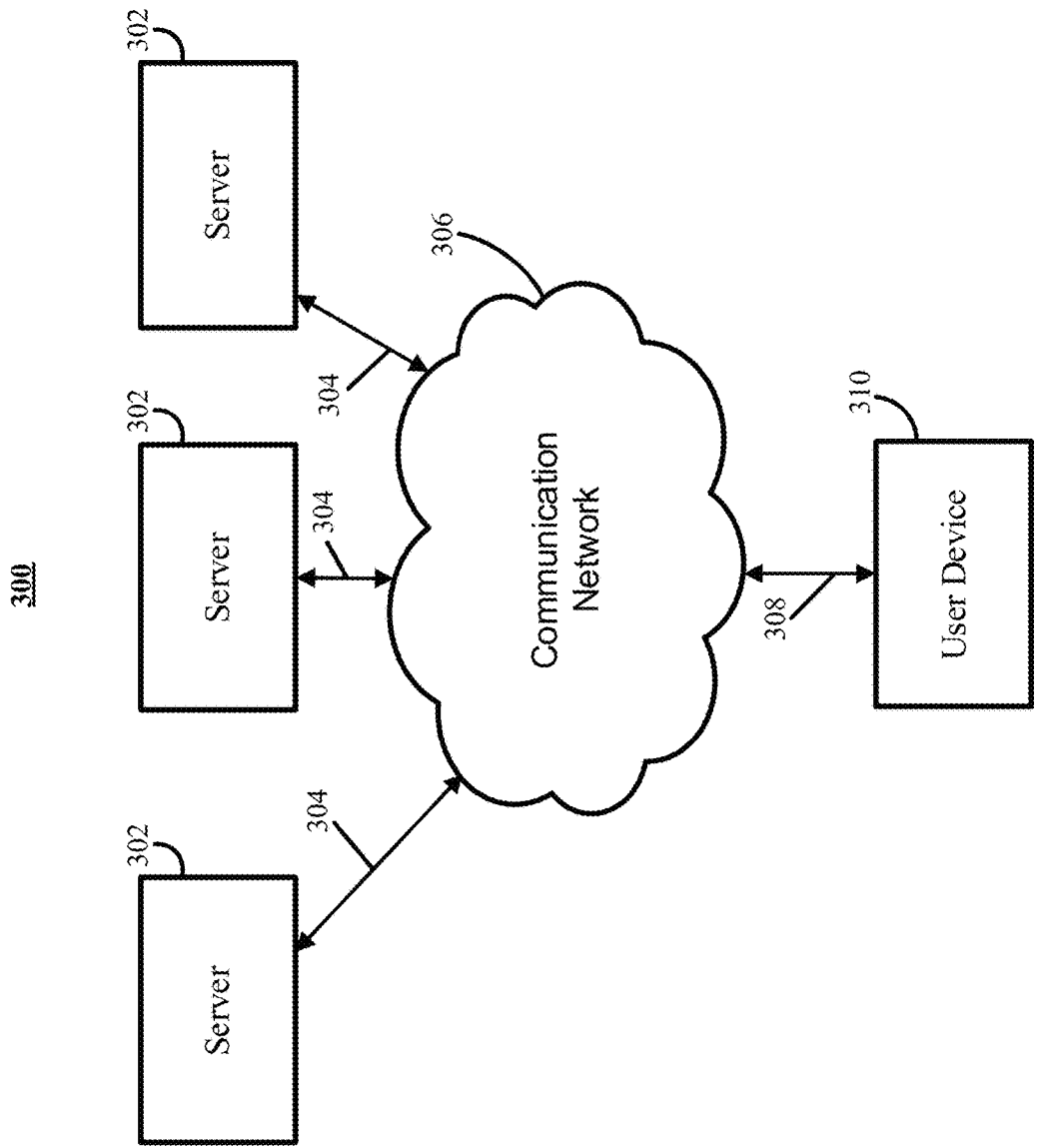
FIG. 7 shows an illustrative example of hardware that can be used in accordance with some embodiments of the disclosed subject matter for providing secure payment authorization channels for protecting transactions in connection with the transmission of a digital asset.

FIG. 7 shows an example 300 of a generalized schematic diagram of a system on which the mechanisms for protecting transactions with secure payment authorization channels as described herein can be implemented in accordance with some embodiments of the disclosed subject matter. As illustrated, system 300 can include one or more user devices 310. For example, as shown in FIGS. 1A-1C, user devices 310 can include publisher devices, publisher ad devices, exchange devices, bidding devices, supply side platform devices, demand side platform devices, auction devices, advertiser ad devices, agency devices, brand devices, etc. User devices 310 can be local to each other or remote from each other. User devices 310 can be connected by one or more communications links 308 to a communication network 306 that can be linked to a server 302 via a communications link 304.

System 300 can include one or more servers 302. For example, as shown in FIGS. 1A-1C, servers 302 can include publisher content servers, publisher ad servers, exchange servers, bidding servers, supply side platform servers, demand side platform servers, auction servers, advertiser ad servers, agency servers, brand servers, etc. Servers 102 can be any suitable server or servers for providing access to the mechanisms described herein for managing access to media content, such as a processor, a computer, a data processing device, or any suitable combination of such devices. For example, the mechanisms for managing access to media content can be distributed into multiple backend components and multiple frontend components and/or user interfaces. In a more particular example, backend components, such as mechanisms for: receiving requests for media content; providing cryptographic key information; causing user device 310 to request an advertisement (or advertisements) in connection with the provided media content; etc., can be performed on one or more servers 302. In another more particular example, frontend components, such as mechanisms for: presentation of a user interface; requesting media content; presentation (e.g., using a display, speakers, etc.) of media content; presentation of an advertisement; presentation of payments made in a given transaction; presentation of media content that has been displayed and/or blocked from being displayed; etc., can be performed on one or more user devices 310 or one or more servers 302.

In some embodiments, each of user devices 310, and server 302 can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, user device 310 can be implemented as a smartphone, a tablet computer, a mobile telephone, a wearable computer, a vehicle (e.g., an automobile, a boat, an airplane, or any other suitable vehicle) entertainment system (e.g., a radio, a built-in display, etc.), a personal computer, a laptop computer, a digital media receiver, a set-top box, a smart television, a home entertainment system, a game console, any other suitable computing device, or any suitable combination thereof.

Communications network 306 can be any suitable computer network or combination of such networks including the Internet, an intranet, a wide-area network (WAN), a local-area network (LAN), a wireless network, a Wi-Fi network, a digital subscriber line (DSL) network, a frame relay network, an asynchronous transfer mode (ATM) network, a virtual private network (VPN), an intranet, etc. Each of communications links 304 and 308 can be any communications links suitable for communicating data among user devices 310 and server 302, such as network links, dial-up links, wireless links, hard-wired links, any other suitable communications links, or any suitable combination of such links. Note that, in some embodiments, multiple servers 302 can be used to provide access to different mechanisms associated with the mechanisms described herein for managing access to media content.

Figure 8:
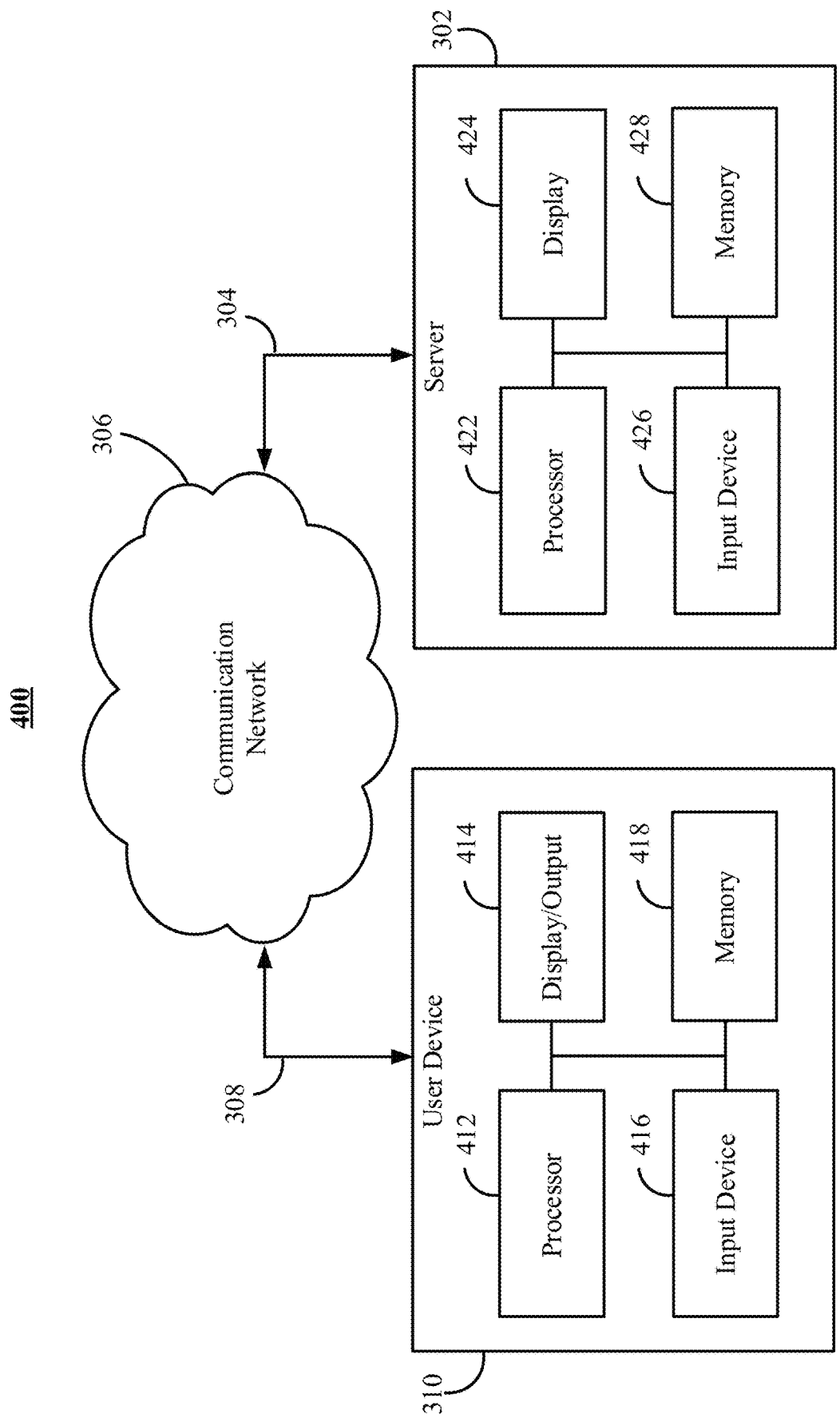
FIG. 8 shows an illustrative example of hardware that can be used in a server and/or a user device of FIG. 7 in accordance with some embodiments of the disclosed subject matter.

FIG. 8 shows an example 400 of hardware that can be used to implement one or more of user devices 310, and servers 302 depicted in FIG. 7 in accordance with some embodiments of the disclosed subject matter. Referring to FIG. 8, user device 310 can include a hardware processor 412, a display 414, an input device 416, and memory 418, which can be interconnected. In some embodiments, memory 418 can include a storage device (such as a non-transitory computer-readable medium) for storing a computer program for controlling hardware processor 412.

Hardware processor 412 can use the computer program to execute at least a portion of the mechanisms described herein for protecting transactions in connection with the transmission of a digital asset and/or for performing any other suitable task associated with the mechanisms described herein. In some embodiments, hardware processor 412 can send and receive data through communications link 308 or any other communication links using, for example, a transmitter, a receiver, a transmitter/receiver, a transceiver, or any other suitable communication device. Display 414 can include a touchscreen, a flat panel display, a cathode ray tube display, a projector, a speaker or speakers, and/or any other suitable display and/or presentation devices. Input device 416 can be a computer keyboard, a computer mouse, a touchpad, a voice recognition circuit, a touchscreen, and/or any other suitable input device. In some embodiments, the computer program can cause hardware processor 412 to, for example, execute one or more portions of process 100 as described below in connection with FIGS. 1A-1C.

Server 302 can include a hardware processor 422, a display 424, an input device 426, and memory 428, which can be interconnected. In some embodiments, memory 428 can include a storage device (such as a non-transitory computer-readable medium) for storing data received through communications link 304 or through other links. The storage device can further include a server program for controlling hardware processor 422. In some embodiments, memory 428 can include information stored as a result of a portion of a transaction (e.g., buyer wallet information, seller wallet information, payment information, transaction type information, publisher information, top level wallet information, signature information, etc.) (e.g., as described above in connection with flow diagram 100 of FIGS. 1A-1C).

Hardware processor 422 can use the server program to communicate with user devices 110 and/or other servers, as well as provide access to and/or copies of mechanisms described herein. It should also be noted that data received through communications link 304 or any other communications links can be received from any suitable source. In some embodiments, hardware processor 422 can send and receive data through communications link 304 or any other communications links using, for example, a transmitter, a receiver, a transmitter/receiver, a transceiver, or any other suitable communication device. In some embodiments, hardware processor 422 can receive commands and/or values transmitted by one or more user devices 310 and/or one or more users of server 302, such as a user that makes changes to adjust transaction, payment, or secure communications settings associated with the mechanisms described herein for controlling access to media content. Display 424 can include a touchscreen, a flat panel display, a cathode ray tube display, a projector, a speaker or speakers, and/or any other suitable display and/or presentation devices. Input device 226 can be a computer keyboard, a computer mouse, a touchpad, a voice recognition circuit, a touchscreen, and/or any other suitable input device.

In some embodiments, server 302 can be implemented in one server or can be implemented as any suitable number of servers. For example, multiple servers 302 can be implemented in various locations to increase reliability and/or increase the speed at which the server can communicate with user devices 310. Additionally or alternatively, as described above in connection with FIG. 7, multiple servers 302 can be used to perform different tasks associated with the mechanisms described herein.

In some embodiments, any suitable computer readable media can be used for storing instructions for performing the functions and/or processes herein. For example, in some embodiments, computer readable media can be transitory or non-transitory. For example, non-transitory computer readable media can include media such as magnetic media (e.g., hard disks, floppy disks, and/or any other suitable magnetic media), optical media (e.g., compact discs, digital video discs, Blu-ray discs, and/or any other suitable optical media), semiconductor media (e.g., flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for protecting transactions with secure payment authorization channels are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for authorization of a secure transaction in connection with transmitting digital assets, the method comprising:
   storing, in an account database of a server that includes a hardware processor, a plurality of accounts that includes a plurality of buyer accounts, a plurality of seller accounts, and a plurality of exchange accounts, wherein each of the plurality of accounts is associated with a wallet identifier and a private key;
   receiving, by the server, a payment beacon from a first device to bid on a digital asset for placement on a web page;
   determining, by the server, that the payment beacon includes the wallet identifier associated with a buyer account from the plurality of buyer accounts, the wallet identifier associated with an exchange account from the plurality of exchange accounts, a first transaction amount between the buyer account and the exchange account, and the private key associated with the buyer account;
   storing, by the server, the payment beacon including the wallet identifier associated with the buyer account from the plurality of buyer accounts, the wallet identifier associated with the exchange account from the plurality of exchange accounts, the first transaction amount between the buyer account and the exchange account, and the private key associated with the buyer account in a cryptographic ledger;
   receiving, at the cryptographic ledger of the server, a concatenated payment beacon;
   determining, by the server, that the concatenated payment beacon is received from a browser application executing on a second device that has loaded the digital asset on the web page, wherein the concatenated payment beacon indicates that the first device that transmitted the payment beacon to bid on the digital asset won an auction for the placement of the digital asset on the web page, and wherein the concatenated payment beacon includes the wallet identifier associated with the buyer account, the wallet identifier associated with the exchange account, the first transaction amount, the private key associated with the buyer account, a second transaction amount between the exchange account and the buyer account, the wallet identifier associated with a seller account from the plurality of seller accounts, and the private key associated with the exchange account;
   matching, by the server, the concatenated payment beacon received from the second device with the payment beacon received from the first device;
   determining, by the server, whether a portion of the payment beacon received from the first device has been modified in the concatenated payment beacon received from the second device;
   in response to determining that the payment beacon has not been modified, storing, by the server, the concatenated payment beacon in the cryptographic ledger, wherein a first secure transaction is generated from the first device having the wallet identifier to the second device having the wallet identifier, wherein a second secure transaction is generated from the second device having the wallet identifier to the first device having the wallet identifier, and a third secure transaction is generated from the second device having the wallet identifier to a third device having the wallet identifier and associated with the digital asset that has been placed on the web page;
   conducting, by the server, the first secure transaction with a first payment account associated with the wallet identifier of the first device, the second secure transaction with a second payment account associated with the wallet identifier of the second device, and the third secure transaction with a third payment account associated with the wallet identifier of the third device;
   determining, by the server, that a similar transaction having a shorter number of hops should replace at least one of the first secure transaction, the second secure transaction, and the third secure transaction; and
   transmitting, by the server, an indication of the similar transaction to at least one of the buyer account, the seller account, and the exchange account based on the determination of the similar transaction having the shorter number of hops.

2. The method of claim 1, further comprising invalidating the first secure transaction, the second secure transaction, and the third secure transaction in response to determining that the payment beacon received from the first device has been modified.

3. The method of claim 1, further comprising:
   transmitting code to a publisher device that is injected into the web page; and
   in response to the injected code determining that the top level domain information of the web page is not deemed to be visible, receiving an indication that code injected into the web page for the placement of the digital asset is likely to have been placed within a nested frame and inhibiting the code from placing the digital asset into the web page.

4. The method of claim 1, further comprising:
   determining whether the private key associated with the buyer account in the payment beacon, the private key associated with the buyer account in the concatenated payment beacon, or the private key associated with the exchange account in the concatenated payment beacon matches a corresponding private key in the account database; and
   in response to determining that one of the private key associated with the buyer account in the payment beacon, the private key associated with the buyer account in the concatenated payment beacon, and the private key associated with the exchange account in the concatenated payment beacon does not match a corresponding private key in the account database, invalidating the first secure transaction, the second secure transaction, and the third secure transaction.

5. The method of claim 1, further comprising:
   determining whether the concatenated payment beacon correctly appended an additional transaction to the payment beacon received from the first device; and in response to determining that the concatenated payment beacon did not correctly append the additional transaction to the payment beacon, invalidating the concatenated payment beacon.

6. The method of claim 1, further comprising:
receiving, from the first device, a request to register for one of the plurality of accounts; and
in response to receiving the request, transmitting, to the first device, the wallet identifier and the private key that authorizes secure transactions using the wallet identifier.

7. A system for authorization of a secure transaction in connection with transmitting digital assets, the system comprising:
a memory; and
a hardware processor that, when executing computer executable instructions stored in the memory, is configured to:
store, in an account database, a plurality of accounts that includes a plurality of buyer accounts, a plurality of seller accounts, and a plurality of exchange accounts, wherein each of the plurality of accounts is associated with a wallet identifier and a private key;
receive a payment beacon from a first device to bid on a digital asset for placement on a web page;
determine that the payment beacon includes the wallet identifier associated with a buyer account from the plurality of buyer accounts, the wallet identifier associated with an exchange account from the plurality of exchange accounts, a first transaction amount between the buyer account and the exchange account, and the private key associated with the buyer account;
store the payment beacon including the wallet identifier associated with the buyer account from the plurality of buyer accounts, the wallet identifier associated with the exchange account from the plurality of exchange accounts, the first transaction amount between the buyer account and the exchange account, and the private key associated with the buyer account in a cryptographic ledger;
receive, at the cryptographic ledger, a concatenated payment beacon;
determine that the concatenated payment beacon is received from a browser application executing on a second device that has loaded the digital asset on the web page, wherein the concatenated payment beacon indicates that the first device that transmitted the payment beacon to bid on the digital asset won an auction for the placement of the digital asset on the web page, and wherein the concatenated payment beacon includes the wallet identifier associated with the buyer account, the wallet identifier associated with the exchange account, the first transaction amount, the private key associated with the buyer account, a second transaction amount between the exchange account and the buyer account, the wallet identifier associated with a seller account from the plurality of seller accounts, and the private key associated with the exchange account;
match the concatenated payment beacon received from the second device with the payment beacon received from the first device;
determine whether a portion of the payment beacon received from the first device has been modified in the concatenated payment beacon received from the second device;

in response to determining that the payment beacon has not been modified, store the concatenated payment beacon in the cryptographic ledger, wherein a first secure transaction is generated from the first device having the wallet identifier to the second device having the wallet identifier, wherein a second secure transaction is generated from the second device having the wallet identifier to the first device having the wallet identifier, and a third secure transaction is generated from the second device having the wallet identifier to a third device having the wallet identifier and associated with the digital asset that has been placed on the web page;
conduct the first secure transaction with a first payment account associated with the wallet identifier of the first device, the second secure transaction with a second payment account associated with the wallet identifier of the second device, and the third secure transaction with a third payment account associated with the wallet identifier of the third device;
determine that a similar transaction having a shorter number of hops should replace at least one of the first secure transaction, the second secure transaction, and the third secure transaction; and
transmit an indication of the similar transaction to at least one of the buyer account, the seller account, and the exchange account based on the determination of the similar transaction having the shorter number of hops.

8. The system of claim 7, wherein the hardware processor is further configured to invalidate the first secure transaction, the second secure transaction, and the third secure transaction in response to determining that the payment beacon received from the first device has been modified.

9. The system of claim 7, wherein the hardware processor is further configured to:
transmit code to a publisher device that is injected into the web page; and
in response to the injected code determining that the top level domain information of the web page is not deemed to be visible, receive an indication that code injected into the web page for the placement of the digital asset is likely to have been placed within a nested frame and inhibiting the code from placing the digital asset into the web page.

10. The system of claim 7, wherein the hardware processor is further configured to:
determine whether the private key associated with the buyer account in the payment beacon, the private key associated with the buyer account in the concatenated payment beacon, or the private key associated with the exchange account in the concatenated payment beacon matches a corresponding private key in the account database; and
in response to determining that one of the private key associated with the buyer account in the payment beacon, the private key associated with the buyer account in the concatenated payment beacon, and the private key associated with the exchange account in the concatenated payment beacon does not match a corresponding private key in the account database, invalidate the first secure transaction, the second secure transaction, and the third secure transaction.

11. The system of claim 7, wherein the hardware processor is further configured to:
    determine whether the concatenated payment beacon correctly appended an additional transaction to the payment beacon received from the first device; and
    in response to determining that the concatenated payment beacon did not correctly append the additional transaction to the payment beacon, invalidate the concatenated payment beacon.

12. The system of claim 7, wherein the hardware processor is further configured to:
    receive, from the first device, a request to register for one of the plurality of accounts; and
    in response to receiving the request, transmit, to the first device, the wallet identifier and the private key that authorizes secure transactions using the wallet identifier.

13. A non-transitory computer-readable medium containing computer executable instructions that, when executed by a processor, cause the processor to perform a method for authorization of a secure transaction in connection with transmitting digital assets, the method comprising:
    storing, in an account database of a server that includes a hardware processor, a plurality of accounts that includes a plurality of buyer accounts, a plurality of seller accounts, and a plurality of exchange accounts, wherein each of the plurality of accounts is associated with a wallet identifier and a private key;
    receiving, by the server, a payment beacon from a first device to bid on a digital asset for placement on a web page;
    determining, by the server, that the payment beacon includes the wallet identifier associated with a buyer account from the plurality of buyer accounts, the wallet identifier associated with an exchange account from the plurality of exchange accounts, a first transaction amount between the buyer account and the exchange account, and the private key associated with the buyer account;
    storing, by the server, the payment beacon including the wallet identifier associated with the buyer account from the plurality of buyer accounts, the wallet identifier associated with the exchange account from the plurality of exchange accounts, the first transaction amount between the buyer account and the exchange account, and the private key associated with the buyer account in a cryptographic ledger;
    receiving, at the cryptographic ledger of the server, a concatenated payment beacon;
    determining, by the server, that the concatenated payment beacon is received from a browser application executing on a second device that has loaded the digital asset on the web page, wherein the concatenated payment beacon indicates that the first device that transmitted the payment beacon to bid on the digital asset won an auction for the placement of the digital asset on the web page, and wherein the concatenated payment beacon includes the wallet identifier associated with the buyer account, the wallet identifier associated with the exchange account, the first transaction amount, the private key associated with the buyer account, a second transaction amount between the exchange account and the buyer account, the wallet identifier associated with a seller account from the plurality of seller accounts, and the private key associated with the exchange account;
    matching, by the server, the concatenated payment beacon received from the second device with the payment beacon received from the first device;
    determining, by the server, whether a portion of the payment beacon received from the first device has been modified in the concatenated payment beacon received from the second device;
    in response to determining that the payment beacon has not been modified, storing, by the server, the concatenated payment beacon in the cryptographic ledger, wherein a first secure transaction is generated from the first device having the wallet identifier to the second device having the wallet identifier, wherein a second secure transaction is generated from the second device having the wallet identifier to the first device having the wallet identifier, and a third secure transaction is generated from the second device having the wallet identifier to a third device having the wallet identifier and associated with the digital asset that has been placed on the web page;
    conducting, by the server, the first secure transaction with a first payment account associated with the wallet identifier of the first device, the second secure transaction with a second payment account associated with the wallet identifier of the second device, and the third secure transaction with a third payment account associated with the wallet identifier of the third device;
    determining, by the server, that a similar transaction having a shorter number of hops should replace at least one of the first secure transaction, the second secure transaction, and the third secure transaction; and
    transmitting, by the server, an indication of the similar transaction to at least one of the buyer account, the seller account, and the exchange account based on the determination of the similar transaction having the shorter number of hops.

14. The non-transitory computer-readable medium of claim 13, wherein the method further comprises invalidating the first secure transaction, the second secure transaction, and the third secure transaction in response to determining that the payment beacon received from the first device has been modified.

15. The non-transitory computer-readable medium of claim 13, wherein the method further comprises:
    transmitting code to a publisher device that is injected into the web page; and
    in response to the injected code determining that the top level domain information of the web page is not deemed to be visible, receiving an indication that code injected into the web page for the placement of the digital asset is likely to have been placed within a nested frame and inhibiting the code from placing the digital asset into the web page.

16. The non-transitory computer-readable medium of claim 13, wherein the method further comprises:
    determining whether the private key associated with the buyer account in the payment beacon, the private key associated with the buyer account in the concatenated payment beacon, or the private key associated with the exchange account in the concatenated payment beacon matches a corresponding private key in the account database; and
    in response to determining that one of the private key associated with the buyer account in the payment beacon, the private key associated with the buyer account in the concatenated payment beacon, and the private key associated with the exchange account in the concatenated payment beacon does not match a corresponding private key in the account database, invalidating the first secure transaction, the second secure transaction, and the third secure transaction.

17. The non-transitory computer-readable medium of claim 13, wherein the method further comprises:
determining whether the concatenated payment beacon correctly appended an additional transaction to the payment beacon received from the first device; and
in response to determining that the concatenated payment beacon did not correctly append the additional transaction to the payment beacon, invalidating the concatenated payment beacon.

18. The non-transitory computer-readable medium of claim 13, wherein the method further comprises:
receiving, from the first device, a request to register for one of the plurality of accounts; and
in response to receiving the request, transmitting, to the first device, the wallet identifier and the private key that authorizes secure transactions using the wallet identifier.

\* \* \* \* \*